United States Patent
Kaminaka et al.

(10) Patent No.: US 9,312,546 B2
(45) Date of Patent: Apr. 12, 2016

(54) STAINLESS STEEL MATERIAL FOR A SEPARATOR OF A SOLID POLYMER FUEL CELL AND A SOLID POLYMER FUEL CELL USING THE SEPARATOR

(75) Inventors: Hideya Kaminaka, Nishinomiya (JP); Junko Imamura, Amagasaki (JP); Yasuto Higashida, Kobe (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 90 days.

(21) Appl. No.: 12/975,608

(22) Filed: Dec. 22, 2010

(65) Prior Publication Data
US 2011/0159397 A1 Jun. 30, 2011

Related U.S. Application Data

(63) Continuation of application No. PCT/JP2009/061765, filed on Jun. 26, 2009.

(30) Foreign Application Priority Data

| Jun. 26, 2008 | (JP) | 2008-167944 |
| Oct. 7, 2008 | (JP) | 2008-260872 |
| Nov. 14, 2008 | (JP) | 2008-292368 |
| Jun. 26, 2009 | (JP) | 2009-152047 |

(51) Int. Cl.
*H01M 8/24* (2006.01)
*H01M 2/16* (2006.01)
(Continued)

(52) U.S. Cl.
CPC ............... *H01M 8/021* (2013.01); *C21D 6/002* (2013.01); *C22C 38/001* (2013.01); *C22C 38/02* (2013.01); *C22C 38/04* (2013.01); *C22C 38/42* (2013.01);
(Continued)

(58) Field of Classification Search
CPC ............ H01M 8/0202; H01M 8/0204; H01M 8/0206; H01M 8/0208; H01M 8/0228; H01M 8/02; H01M 8/021; H01M 8/0213; H01M 8/0215; H01M 8/0217; H01M 8/0219; H01M 8/0221; H01M 8/0223; H01M 8/0226; H01M 8/023; H01M 8/0232; H01M 8/0234; H01M 8/0236; H01M 8/0239; H01M 8/0241; H01M 8/0243; H01M 8/0245
See application file for complete search history.

(56) References Cited

U.S. PATENT DOCUMENTS

| 5,521,027 A * | 5/1996 | Okuno et al. ................. 429/332 |
| 6,379,476 B1 * | 4/2002 | Tarutani et al. ............... 148/325 |

(Continued)

FOREIGN PATENT DOCUMENTS

| CA | 2 469 805 | 6/2003 |
| DE | 10 2007 038171 | 3/2008 |

(Continued)

*Primary Examiner* — Ula C Ruddock
*Assistant Examiner* — Amanda Barrow
(74) *Attorney, Agent, or Firm* — Clark & Brody

(57) ABSTRACT

A stainless steel member comprising a stainless steel base metal; an oxide film located on the surface of the stainless steel base metal; an electroconductive layer located on the surface of the oxide film and comprising a nonmetallic electroconductive material; and an electroconductive material which is located so as to penetrate the oxide film and which electrically contacts the stainless steel base metal and the electroconductive layer is provided as a stainless steel member for a separator of a solid polymer fuel cell having excellent properties such that a degradation in performance is low even after prolonged operation. A solid polymer fuel cell using the stainless steel member is also provided.

8 Claims, 2 Drawing Sheets

(51) Int. Cl.
*H01M 8/10* (2006.01)
*H01M 8/02* (2006.01)
*C21D 6/00* (2006.01)
*C22C 38/00* (2006.01)
*C22C 38/02* (2006.01)
*C22C 38/04* (2006.01)
*C22C 38/42* (2006.01)
*C22C 38/44* (2006.01)
*C22C 38/54* (2006.01)
*C23C 28/00* (2006.01)
*C23F 17/00* (2006.01)
*C23C 28/04* (2006.01)

(52) U.S. Cl.
CPC ............... *C22C 38/44* (2013.01); *C22C 38/54* (2013.01); *C23C 28/00* (2013.01); *C23C 28/042* (2013.01); *C23C 28/048* (2013.01); *C23F 17/00* (2013.01); *H01M 8/0213* (2013.01); *H01M 8/0228* (2013.01); *H01M 2008/1095* (2013.01); *Y02E 60/50* (2013.01)

(56) References Cited

U.S. PATENT DOCUMENTS

| | | | |
|---|---|---|---|
| 6,420,070 B1 * | 7/2002 | Kasamatsu et al. | 429/231.8 |
| 6,440,598 B1 * | 8/2002 | Fukui et al. | 429/509 |
| 6,548,208 B1 * | 4/2003 | Kasamatsu et al. | 429/218.1 |
| 6,884,363 B2 * | 4/2005 | Ohtani et al. | 216/6 |
| 7,507,490 B2 * | 3/2009 | Ohtani et al. | 429/426 |
| 7,838,171 B2 * | 11/2010 | Ohtani et al. | 429/535 |
| 8,182,961 B2 * | 5/2012 | Tanaka et al. | 429/514 |
| 2002/0061445 A1 * | 5/2002 | Kitagawa et al. | 429/231.8 |
| 2004/0002002 A1 * | 1/2004 | Mizuta et al. | 429/188 |
| 2004/0170881 A1 * | 9/2004 | Nakata | 429/34 |
| 2004/0211943 A1 | 10/2004 | Okahara et al. | |
| 2005/0008562 A1 * | 1/2005 | Hyeon et al. | 423/448 |
| 2005/0084730 A1 * | 4/2005 | Ohtani et al. | 429/34 |
| 2005/0089742 A1 * | 4/2005 | Ishigami et al. | 429/34 |
| 2005/0255357 A1 * | 11/2005 | Utsunomiya et al. | 429/34 |
| 2006/0008408 A1 * | 1/2006 | Ho Yoon et al. | 423/447.2 |
| 2007/0037042 A1 * | 2/2007 | Ye et al. | 429/44 |
| 2009/0226785 A1 * | 9/2009 | Kihira et al. | 429/30 |
| 2010/0035120 A1 * | 2/2010 | Sato et al. | 429/34 |
| 2012/0172277 A1 * | 7/2012 | Schacht et al. | 510/264 |
| 2012/0177562 A1 * | 7/2012 | Lovel et al. | 423/448 |

FOREIGN PATENT DOCUMENTS

| | | | | |
|---|---|---|---|---|
| JP | 10-228914 | | 8/1998 | |
| JP | 09-280252 | * | 4/1999 | ............ H01M 8/02 |
| JP | 11-260382 | | 9/1999 | |
| JP | 11-345618 | | 12/1999 | |
| JP | 2000-067881 | | 3/2000 | |
| JP | 2000-323152 | * | 11/2000 | ............ H01M 8/02 |
| JP | 2001-052721 | | 2/2001 | |
| JP | 3365385 | | 11/2002 | |
| JP | 2003-532528 | | 11/2003 | |
| JP | 2005-209394 | | 8/2005 | |
| JP | 2005-243595 | * | 9/2005 | ............ H01M 8/02 |
| JP | 2007-031233 | | 2/2007 | |
| JP | 2007-165275 | | 6/2007 | |
| WO | 99/19927 | | 4/1999 | |
| WO | 01/18895 | | 3/2001 | |
| WO | 03/044888 | | 5/2003 | |

\* cited by examiner

STAINLESS STEEL MATERIAL FOR A SEPARATOR OF A SOLID POLYMER FUEL CELL AND A SOLID POLYMER FUEL CELL USING THE SEPARATOR

TECHNICAL FIELD

The present invention relates to a solid polymer fuel cell and a stainless steel for a separator which is a component of the fuel cell.

BACKGROUND ART

A fuel cell is a next-generation power generation system which is expected to be installed and widely used from the viewpoints of energy conservation and concern for the environment, since a fuel cell utilizes energy generated during a reaction combining hydrogen and oxygen. There are several types of fuel cells including a solid electrolyte type, a molten carbonate type, a phosphoric acid type, and a solid polymer type.

A solid polymer fuel cell has gathered particular attention for use as a power source for an electric vehicle and a dispersed power source for household use, since a solid polymer fuel cell can be easily downsized because of its high power density, and it is easy to start and stop because of its relatively low operating temperature compared to other types of fuel cell.

FIG. 1 shows a structure of a solid polymer fuel cell, which may be referred to as a fuel cell. FIG. 1(a) is an exploded view of a unit cell of the fuel cell, and FIG. 1 (b) is a perspective view of a fuel cell formed by assembling a number of the unit cells.

As shown in FIG. 1, a fuel cell 1 consists of a stack of unit cells. Each unit cell comprises, as shown in FIG. 1(a), a solid polymer electrolyte membrane 2, a gaseous diffusion electrode layer 3 functioning as a negative electrode, which may be referred to below as a fuel electrode or an anode, the anode being laminated on one surface of the solid polymer electrolyte membrane, a gaseous diffusion electrode layer 4 functioning as a positive electrode, which may be referred to below as an oxidant electrode or a cathode, the cathode being laminated on the other surface of the solid polymer electrolyte membrane, and separators (bipolar plates) 5a and 5b which are laminated on both outer surfaces of the gas diffusion electrode layers.

A fuel cell may be a water-cooled type comprising a water separator having a passageway for cooling water which is disposed between the unit cells or disposed at an assembly of several unit cells. The present invention relates to such a water-cooled fuel cell.

The solid polymer electrolyte membrane 2, which may be referred to below as an electrolyte membrane, is formed of a fluorine-type proton-conducting membrane having a proton-exchange group. The anode 3 and the cathode 4 may comprise a catalyst layer containing a particulate platinum catalyst and graphite powder, and optionally a fluorine resin having a proton-exchange group. In this case, the reaction for generating power is promoted by contacting this catalyst layer with a fuel gas or oxidizing gas.

Fuel gas (hydrogen or hydrogen-containing gas) A is distributed through passages 6a provided in the separator 5a to supply hydrogen to the fuel electrode membrane 3. Oxidizing gas B such as air is distributed through passages 6b provided in the separator 5b to supply oxygen. Direct current power is generated by an electro-chemical reaction caused by supplying these gases.

A separator for a solid polymer fuel cell needs to perform the following functions.

(1) A function as a path uniformly distributing fuel gas or oxidizing gas in the surface of a cell,
(2) a function as a path efficiently exhausting water formed in the cathode side with carrier gases such as air and oxygen from a fuel cell,
(3) a function as an electrical path by contacting electrode membranes (anode 3, cathode 4), and further as an electrical connector between unit cells,
(4) a function as a partition wall between an anodic chamber of one unit cell and a cathodic chamber of an adjoining unit cell, and
(5) a function as a partition wall between a water-cooling passageway of a water-cooled fuel cell and a unit cell adjacent to the water-cooling passageway.

The substrate of such a separator for a solid polymer fuel cell, which will be referred to below as a separator, is roughly classified as a metallic material or a carbonaceous material.

A separator of a metallic material such as stainless steel, titanium, and carbon steel is produced by a process such as pressing. On the other hand, a separator of a carbonaceous material is produced by several different processes. Examples of such processes include a method of firing a graphite substrate in which a thermosetting resin such as a phenol resin and a furane resin is impregnated, and a method of forming a glassy carbon by mixing a carbon powder with a phenol resin, a furane resin, tar pitch, or the like, press molding or injection molding the resulting mixture to form a planar member, and sintering the resulting molded member.

A metallic material such as stainless steel has the advantage that the weight of a separator can be reduced since this material has a high degree of machinability derived from its being a metal, and hence the thickness of a separator can be reduced. However, the electroconductivity may be reduced by elution of metal ions due to corrosion or oxidation of the surface of the metal. Therefore, a separator formed of a metallic material, which is referred to below as a metallic separator, has the problem that contact resistance between a metallic separator and a gaseous diffusion electrode layer may increase.

On the other hand, a carbonaceous material has the advantage that the weight of the obtained separator is small. However, a separator formed of a carbonaceous material has problems such as high gas-permeability and low mechanical strength.

As one method for solving the above-described problem of a metallic separator, it is proposed in Patent Document 1 that the contact surface of a metallic separator with an electrode be coated with gold plating. However, utilizing a large amount of gold for vehicles such as cars and fixed fuel cells is problematic from the viewpoints of economic efficiency and availability of resources.

Therefore, it has been proposed to coat the surface of a metallic separator with carbon to resolve the above-described problem without using gold.

The following technologies relating to a method of coating the surface of a metallic separator with carbon have been proposed.

(A) The material of a painted metallic separator for a solid polymer fuel cell disclosed in Patent Document 2 comprises a substrate formed of an austenitic stainless steel surface which has been acid-washed and an electroconductive paint film having a thickness of 3 to 20 micrometers on the substrate. An electroconductive agent in the paint film is a mixture of graphite powder and carbon black. This patent document discloses a process in which the surface of a substrate of a metallic separator is washed by an acid and the surface of the substrate after acid-washing is coated with an electroconductive paint containing carbon.

(B) Patent Document 3 discloses a paint for a separator for a fuel cell which contains graphite as an electroconductive material and which is capable of forming an electroconductive paint film by coating he surface of a metallic or carbonaceous separator for a fuel cell with the paint. This paint contains a binder consisting of a copolymerized material (VDF-HFP copolymer) of vinylidene fluoride (VDF) and hexafluoropropylene (HFP) in an amount of 10 percent by weight or more, and a solvent compatible with the binder. The ratio by weight of the content of the electroconductive material and the content of the binder is 15:85 to 90:10, and the content of the solvent is 50 to 90 percent by weight.

(C) Patent Document 4 discloses a separator for a fuel cell forming a gas passageway together with a planar electrode of a unit cell. The separator comprises a metallic plate having low electric resistance and an amorphous carbon film which covers the metallic plate and forms the surface of the gas passageway. The hydrogen content of the amorphous carbon film CH is 1 to 20 atomic percent. This document proposes a method of forming a carbonaceous film by thin-film deposition technology such as P—CVD and ion beam deposition instead of the above-described electroconductive paint film.

(D) Patent Document 5 discloses a method in which a substrate which is formed of stainless steel and which has carbonaceous particles adhered to its surface is heated. Since a diffusion layer is formed between the carbon particles and the substrate, the adhesion of the carbon particles is increased and the electroconductivity between the carbon particles and the substrate is improved.

(E) Patent Document 6 discloses a metallic separator having an electroconductive resin layer which is formed on the surface of a metallic substrate forming an electroconductive gas passageway. Carbon powder is dispersed in the electroconductive resin layer. In addition, Zr, Sn, Al, chromium-containing compounds, and/or molybdenum-containing compounds are disposed between the metallic separator and the electroconductive resin layer.

Patent Document 1: JP10-228914A
Patent Document 2: JP11-345618A
Patent Document 3: WO2003/44888
Patent Document 4: JP2000-67881A
Patent Document 5: WO99/19927
Patent Document 6: WO2001/18895
Patent Document 6: JP3365385B

DISCLOSURE OF INVENTION

Above-described methods (A) to (E) were proposed so as to solve the above-described problems of a separator formed of a metal such as stainless steel. However, none of these techniques has been put to practical use. It is thought that each of these techniques has a technical problem to be solved. Problems of those techniques which were found by confirmatory experiments performed by the present inventors are listed below.

Above-described method (A) relates to a method in which a surface oxide film of a stainless steel substrate is removed by pickling and the surface of the substrate after pickling is coated with an electroconductive paint containing carbon. The member which is coated with the electroconductive paint after pickling increases in contact resistance compared to a member just after pickling which is not subjected to coating with the electroconductive paint. The contact resistance of the member after coating the electroconductive paint is a notch above the contact resistance of a gold-plated member. Therefore, this technique cannot be an alternative to gold plating.

Above-described method (B) has problems such as paint stripping during assembly of a fuel cell and paint stripping caused by swelling and shrinking of an MEA (Membrane-Electrode Assembly) accompanying starting and stopping of a fuel cell, since the adhesion of the resulting electroconductive paint film to the substrate is not sufficient.

Above-described method (C) cannot be used for mass production, since thin-film deposition technologies are costly and take a long time for deposition.

Above-described method (D) requires a process in which carbonaceous particles are attached to the surface of a stainless steel substrate, the resulting substrate is rolled, and heat treatment is carried out on the rolled substrate so as to form a diffusion layer between the substrate and the carbonaceous particles. Since a substrate for a press-molded separator generally has a thickness of 300 micrometers or less, when such a substrate is subjected to heat treatment (at around 700 degrees C.) for forming the diffusion layer, non-uniform deformation of the substrate occurs. Therefore, it is difficult for the substrate after heat treatment to have the required dimensional accuracy such as the required flatness. In addition, heat treatment must be performed in an inert gas or in a vacuum so as to avoid increasing contact resistance due to the formation of an excessive oxide film on the surface of the substrate during heat treatment. Therefore, heat treatment contributes to a large increase in costs. In this method, it is expected that carbon from the carbonaceous particle penetrates the passivation film existing on the surface of the substrate in heat treatment, and that a carbon-diffused layer is formed at the uppermost part of the metallic portion of the substrate and just under the uppermost part of the substrate, so that contact resistance is reduced. However, in fact, a local electric cell is formed between the carbon-diffused layer which is formed and the metallic portion of the substrate during the operation of a fuel cell. The metallic portion of the substrate then corrodes and thereby increases the contact resistance of the separator. Accordingly, this method cannot be put to practical use.

In above-described method (E), the binder employed for the Zr, Sn, Al, chromium-containing compounds, and/or molybdenum-containing compounds causes an increase in the contact resistance of the separator. Therefore, a separator having a contact resistance as low as a gold-plated separator cannot be obtained by this method.

A separator formed of stainless steel, which is referred to below as a stainless separator, has a high degree of practicality from the standpoint of material cost and processing cost. The high degree of corrosion resistance of a stainless separator is a result of the passivation layer existing on its surface. However, since this passivation layer causes an increase in contact resistance, a stainless separator has the problem that the resistive loss of the charge generated by an electro-chemical reaction is large.

Although means such as plating gold or coating carbon on a separator have been proposed so as to solve the above-described problems, such means cannot promote the spread of stainless separators in the market.

Patent Document 7 discloses a method in which electroconductive precipitates formed of a boride and/or a carbide in stainless steel are exposed on the surface of the stainless steel so that these precipitates penetrate a passivation film disposed on the surface of the stainless steel. These precipitates thus contact a gaseous diffusion electrode, whereby the electroconductivity between the separator and the gaseous diffusion electrode is ensured. This method has the effect that contact resistance is drastically reduced. However, due to the environment during the operation of a solid polymer fuel cell, an oxide formed atop the precipitates gradually grows as the operation of a fuel cell continues. Therefore, this method has the problem that the contact resistance increases when the fuel cell is operated for a long period, and as a result the output voltage gradually decreases. Such a problem can be solved if increase in the contact resistance can be prevented by an economical means.

The object of the present invention can be to prevent the above-described increase in the contact resistance without decreasing the corrosion resistance of a stainless separator, and to thereby provide with a high degree of productivity, namely, at a low cost, a stainless steel for a separator of a solid polymer fuel cell having excellent properties such that a degradation in performance is low even after prolonged operation, and a fuel cell using the separator.

The present inventors investigated how to achieve the above-described object.

When the present inventors tested conventional techniques, it was found that gold-plating provides the lowest contact resistance and the lowest increase in the contact resistance after operating a fuel cell.

However, the official price of gold is 3068 Japanese yen per gram (according to the morning edition of the Nihon Keizai Shimbun dated Jun. 17, 2008). Namely, gold is expensive and its price has a tendency to increase. In addition, gold is a scarce resource and hence there is no possibility of large usage of gold for industrial purposes.

Several methods in which carbon is coated on a metallic separator (stainless separator) are proposed as examples of a method of using a metallic separator without gold plating.

The present inventors tested the conventional methods related to carbon coating and found that carbon coating indeed has an effect of reducing contact resistance, but the degree of the effect is insufficient, and they found that these methods have problems that (1) the contact resistance obtained from a carbon-coated separator is larger than the contact resistance obtained from a gold-plated separator and that (2) the effect may not last in some cases in which the coated carbon is removed during operation.

The average specific resistance of carbon is $1375 \times 10^{-6}$ $\Omega$cm, as described on page 325 of "Wakai Gijutsusha no Tameno Kikai Kinzoku Zairyou", issued by Maruzen Company, Ltd., while the specific resistance of gold is $2.35 \times 10^{-6}$ $\Omega$cm. Therefore, it is obviously difficult for the contact resistance of a metallic separator (stainless separator) subjected only to coating with carbon to be as low as the contact resistance of a metallic separator on which gold is plated.

The present inventors considered such differences in the intrinsic properties of materials and investigated a means of coating carbon which is capable of providing as low a contact resistance as gold plating and which is free of the problem that the coated carbon is removed during the operation of a fuel cell. The present inventor found the following as a result of the investigation. The object which has not been achieved by conventional techniques is achieved by combining these findings.

a) A stainless steel member for a separator comprises a stainless steel base metal, an oxide film located on the surface of the stainless steel base metal, an electroconductive layer located on the surface of the oxide film and comprising a nonmetallic electroconductive material, and an electroconductive boride-type metallic inclusion having a $M_2B$-type structure, the inclusion being located so as to penetrate the oxide film and so as to be partly embedded in the stainless steel base metal, and the inclusion electrically contacting the stainless steel base metal and the electroconductive layer.

The term "stainless steel base metal" means a part of stainless steel which is a metallic raw material of a stainless steel member for a separator and which does not include a passivation film.

The term "oxide film located on the surface of the stainless steel base metal" means a passivation layer disposed on the surface of the stainless steel. Because of this passivation film, the corrosion resistance of a separator can increase during the operation of a fuel cell.

The term "electroconductive boride-type metallic inclusion having a $M_2B$-type structure", which is referred to below as an $M_2B$-type boride, is an electroconductive compound formed of metallic elements forming the stainless steel member, specific examples of the elements including Fe, Cr, Ni, Mo, and boron contained in the stainless steel member. This compound has a stoichiometric relation such that the ratio of the number of atoms of the metallic elements in the compound to the number of boron atoms in the compound is about 2.

As disclosed in above-described Patent Document 7, the $M_2B$-type boride discretely exposed on the surface is a precipitate which is precipitated in a stainless steel base metal and which is exposed on the surface of the stainless steel member so as to penetrate the passivation film located on the surface of the stainless steel base metal. Therefore, the contact resistance between the $M_2B$-type boride and the stainless steel of a separator is especially small. Additionally, in a solid polymer fuel cell comprising a separator formed of a stainless steel member containing this $M_2B$-type boride, the separator electrically contacts a gaseous diffusion electrode layer at this electroconductive $M_2B$-type boride. Accordingly, excellent electrical contact between a separator and a gaseous diffusion electrode layer is obtained through this electroconductive $M_2B$-type boride.

However, such $M_2B$-type borides are discretely disposed on the surface of a separator, namely, the $M_2B$-type borides are not disposed so as to cover the surface of a separator. In addition, a gaseous diffusion electrode layer facing the separator has a suitable surface roughness. Therefore, not all of the $M_2B$-type borides disposed on the surface of the separator can electrically contact the gaseous diffusion electrode layer. Namely, the electrical contact area of a separator having the above-described structure and a gaseous diffusion electrode layer can increase.

The present inventors performed further investigations based on the above-described findings and made another finding that when a separator has a structure in which an electroconductive layer comprising a nonmetallic electroconductive material is located on the surface of an oxide film and this electroconductive layer electrically contacts $M_2B$-type borides exposed on the surface of the separator, the separator decreases in the contact resistance with a gaseous diffusion electrode layer. The area of electrical contact between the separator and the gaseous diffusion electrode layer is thought to be increased because of a charge-collecting phenomenon occurring at the surface of a stainless steel member of the separator, the details of which phenomenon will be explained below.

The term "nonmetallic electroconductive material" means an electroconductive material in which a substance mainly acting as a charge carrier does not have a metallic bond. A typical example of such a nonmetallic electroconductive material is graphite. Metallic ions are hardly eluted from the nonmetallic electroconductive material, even when corrosion occurs due to the operation of a fuel cell. Therefore, an increase in contact resistance caused by a corrosion product does not readily occur. In addition, a degradation in a solid polymer electrolyte membrane caused by metallic ions diffusing in the membrane does not readily occur.

The above-described electroconductive layer is preferably formed on the surface of the $M_2B$-type borides as well as on the surface of the oxide film from the viewpoint of decreasing the contact resistance, and particularly preventing an increase over time in contact resistance.

Namely, an oxide is also formed atop the $M_2B$-type boride due to the oxidation of the $M_2B$-type boride, which oxide is referred to below as a surface oxide of the $M_2B$-type boride so as to distinguish it from the oxide film on the stainless steel base metal. This surface oxide of the $M_2B$-type boride grows by progressive corrosion of the $M_2B$-type boride due to the operation of a fuel cell. Accordingly, there is a possibility of the performance of a fuel cell decreasing with time because of an increase in the contact resistance between the separator and the gaseous diffusion electrode layer.

Therefore, the increase over time of the contact resistance between the separator and a member forming the gaseous diffusion electrode layer is prevented by covering the exposed $M_2B$-type boride with the nonmetallic electroconductive material.

The surface oxide of the $M_2B$-type boride is relatively soft and its formation rate is relatively slow compared to a passivation film on the surface of the stainless steel member. Therefore, the surface oxide of the $M_2B$-type boride is removed only by sliding the surface of the $M_2B$-type boride on a soft nonmetallic electroconductive material such as graphite, whereby excellent electroconductivity between the $M_2B$-type boride and the nonmetallic electroconductive material is obtained.

When the surface oxide of the $M_2B$-type boride is excessively thick, it is difficult to obtain a low contact resistance even after covering the surface oxide with the nonmetallic electroconductive material. Therefore, it is preferable that the separator be subjected to pickling prior to being covered with the nonmetallic electroconductive material so as to remove the surface oxide of the $M_2B$-type boride and expose the surface of the $M_2B$-type boride.

From the viewpoint of sufficient electrical connection, it is only necessary for a surface of a $M_2B$-type boride disposed on the surface of the separator facing the gaseous diffusion electrode layer when assembled to form a fuel cell to be covered with the nonmetallic electroconductive material.

b) The nonmetallic electroconductive material preferably comprises graphite.

Examples of the nonmetallic electroconductive material other than the above-described graphite include carbon black and an electroconductive paint. These materials can be used as long as a stainless steel member including the nonmetallic electroconductive material has a sufficient degree of electroconductivity which is required for a separator assembled in a fuel cell. It is preferable that the stainless steel member be covered with graphite, namely, that the nonmetallic electroconductive material comprise graphite, from the viewpoints of high chemical stability, high electroconductivity, and a high degree of adhesion to the $M_2B$-type boride.

A separator covered with a carbonaceous material has been proposed, but no prior art limits the properties and the structure of the carbonaceous material. For example, Patent Document 3 merely discloses that carbonaceous material comprises a mixture of carbon black and graphite powders.

The present inventor performed a detailed investigation of this graphite and found that a high degree of adhesion and an especially low degree of contact resistance are obtained when a stainless steel member is covered with graphite having a lattice spacing of the c plane d002 of 3.390 angstroms or less.

The value of a lattice spacing of the c plane d002 of graphite is determined to be 3.390 angstroms or less for the following reasons.

(i) The plasticity of graphite increases as the lattice spacing of the c plane decreases to reach 3.354 angstroms at which value of the crystal of graphite is in an ideal condition. Since graphite having the lattice spacing of the c plane d002 of 3.390 angstroms or less has a high degree of plasticity, such graphite can readily cover the surface of an $M_2B$-type boride.

(ii) Graphite having a high degree of crystallinity has an anisotropic nature (as shown in Table 1 of "The Properties of Graphite and Deployment of Technology Thereof", Hitachi Powder Metallurgy Technical Report, No. 3 (2004)). The specific resistance in the a-axis direction is as low as 4 to $7\times10^{-5}$ $\Omega$cm, while the specific resistance in the c-axis direction is as high as 1 to $5\times10^{-1}$ $\Omega$cm. The electroconductivity in the a-axis direction results from the conjugation of pi bonds in sp2 hybridized orbitals of graphite and hence the specific resistance of graphite decreases as the crystallinity of graphite increases. Therefore, when graphite having a lattice spacing of the c plane d002 of 3.390 angstroms or less is employed, the specific resistance in the a-axis direction of such graphite is especially decreased. Accordingly, the total specific resistance in graphite is decreased and hence contact resistance is reduced. As described above, the specific resistance of common carbon is $1375\times10^{-6}$ $\Omega$cm on average, namely, about $1.4\times10^{-3}$ $\Omega$cm ("Wakai Gijutsusha no Tameno Kikai Kinzoku Zairyou", issued by Maruzen Company, Ltd., page 325). Therefore, it is preferable to utilize this low specific resistance of graphite in the a-axis direction (4 to $7\times 10^{-5}$ $\Omega$cm).

(iii) When a surface consisting of the surface of the oxide film and the surface of the $M_2B$-type boride, which is referred to below as a surface to be treated, is made to slide on graphite with a high degree of crystallinity, the graphite is torn off in the form of flaky particles and adheres to the surface of the oxide film. The adhering particles of graphite are then oriented so that the a-axis direction of the particles, which has a low specific resistance, is parallel to the surface of the stainless steel member, since the particles are flaky. Therefore, electricity readily flows in the direction parallel to the surface (in-plane direction), as shown in FIG. 3.

Since the $M_2B$-type boride electrically contacts the electroconductive layer, an electric charge which is transferred in the in-plane direction of the electroconductive layer can flow into the $M_2B$-type boride. Therefore, the electrical charge which is transferred in the electroconductive layer can flow into the stainless steel base metal via the $M_2B$-type boride, since the $M_2B$-type boride is partly embedded in the stainless steel base metal. Namely, the $M_2B$-type boride functions as a connecting point to electrically connect the electroconductive layer with the stainless steel base metal. In other words, the $M_2B$-type boride functions as a charge-collecting point which transfers the electric charge flowing in the electroconductive layer to the stainless steel base metal. When graphite having a lattice spacing of the c plane d002 of 3.390 angstroms or less is employed, this charge-collecting effect markedly occurs and hence the contact resistance is markedly reduced.

Graphite carbon also adheres atop the $M_2B$-type boride by the above-described sliding procedure. At this time, the surface oxide of the $M_2B$-type boride is removed.

(iv) Since graphite has a greater tendency to erode at portions of lower crystallinity, graphite increases in corrosion resistance as it increases in crystallinity. Therefore, the electroconductive layer including graphite having a lattice spacing of the c plane d002 of 3.390 angstroms or less effectively functions as a corrosion-inhibiting layer in the stainless steel member. In addition, when the electroconductive layer including graphite is formed atop the surface of the $M_2B$-type boride, the formation and growth of the surface oxide of the $M_2B$-type boride is prevented for a long period of time. Therefore, a change in contact resistance with time does not readily occur.

(v) The degree of orientation of graphite can be measured by the ratio of the peak intensity of a diffraction line of a (110) atomic plane corresponding to the in-plane direction to the peak intensity of a diffraction line of a (004) atomic plane corresponding to the c-axis direction, these peak intensities being measured by wide-angle X-ray diffraction ($2\theta/\theta$ scan method). When the graphite covering the surface of the stainless steel member has a crystallinity such that the value of the lattice spacing of the c plane d002 is 3.390 angstroms or less and the ratio of the peak intensity of a (110) diffraction line to the peak intensity of a (004) diffraction line, these peak intensities being measured by wide-angle X-ray diffraction of the crystal of the graphite, which is defined as I(110)/I(004), is less than 0.1, the a-axis direction of graphite having a low specific resistance is almost parallel to the surface of the stainless steel member. Therefore, the low specific resistance of the a-axis direction of graphite (4 to $7 \times 10^{-5}$ Ωcm) can be sufficiently utilized. I(110)/I(004) is preferably less than 0.05.

c) It is preferable that the surface to be treated be subjected to coating solely with an adhesive agent followed by being made to slide on graphite so that graphite adheres to the surface to be treated.

When an electroconductive layer comprising graphite is coated on a substrate, it is common to prepare an electroconductive paint containing graphite and then to coat this electroconductive paint on the substrate to form an electroconductive layer. However, such a paint is a mixture of a powder of graphite and an adhesive agent of resin which does not have high electroconductivity. Therefore, a coating film formed from the above-described paint has a tendency to have greater contact resistance compared to a film formed by covering a surface to be treated only with graphite. Therefore, it is desirable for the material forming an electroconductive layer not to use a resin-based adhesive agent so as to obtain an electroconductive layer comprising graphite having contact resistance close to that of gold plating. However, managing the procedure of forming an electroconductive layer can be easier when using an adhesive agent. For this reason, in some cases, it is preferable that an adhesive agent be used from the view point of achieving high productivity.

The present inventor investigated how to form the electroconductive layer according to the present invention. It was found that the adhesion between an electroconductive layer and a surface to be treated can be improved without increasing the contact resistance of the electroconductive layer not by coating with an electroconductive paint obtained by mixing an adhesive agent and graphite but by coating the surface to be treated with merely an adhesive agent and then subjecting the surface to be treated to the above-described sliding procedure so that graphite adheres to the surface to be treated having the adhesive agent on the surface. In this case, it is preferable that the weight of the adhesive agent be 2% of the weight of the graphite.

The present invention was achieved based on the above-described findings.

One aspect of the present invention is a stainless steel member for a separator of a solid polymer fuel cell, the member comprising a stainless steel base metal, an oxide film located on the surface of the stainless steel base metal, an electroconductive layer located on the surface of the oxide film and comprising a nonmetallic electroconductive material, and an electroconductive material which is located so as to penetrate the oxide film and which electrically contacts the stainless steel base metal and the electroconductive layer.

The above-described electroconductive material preferably is formed of a boride-type metallic inclusion which has a $M_2B$-type structure and which is partly embedded in the stainless steel base metal.

The above-described electroconductive layer is preferably located on the surface of the electroconductive material.

The above-described boride-type metallic inclusion preferably contains a chromium boride.

The above-described nonmetallic electroconductive material preferably comprises graphite.

The value of the lattice spacing of d002 of the above-described graphite is at most 3.390 angstroms.

When comparing peak intensities of diffraction lines of atomic planes of a crystal of the above-described graphite located on the surface of the oxide film as measured by wide-angle X-ray diffraction, it is preferable that the ratio of the peak intensity of a diffraction line of a (110) atomic plane to the peak intensity of a diffraction line of a (004) atomic plane be less than 0.1.

The above-described electroconductive layer is prepared by sliding a member containing graphite on a surface consisting of the surface of the oxide film and the surface of the boride-type metallic inclusion exposed on the stainless steel base metal (a surface to be treated). The wide-angle X-ray diffraction means the 2θ/θ scan method in which the surface of specimen which is irradiated with the X-ray is the surface of a steel plate and the rotation axis of a goniometer is on the surface so as to minimize the measurement error of the diffraction angle and the intensity.

The above-described surface of the oxide film and the surface of the boride-type metallic inclusion exposed on the stainless steel base metal (the surface to be treated) preferably have an Ra roughness of at least 0.10 micrometers.

The above-described electroconductive layer is preferably prepared by coating a composition comprising graphite and an adhesive agent on a surface consisting of the surface of the oxide film and the exposed surface of the boride-type metallic inclusion (the surface to be treated), the content of the adhesive agent in the composition being at most 2% of the content by weight of the graphite in the composition.

The above-described adhesive agent preferably contains at least one of PVDF (polyvinylidene difluoride) and PTFE (polytetrafluoroethylene).

Another aspect of the present invention is a solid polymer fuel cell having a stack of unit cells with individual separators disposed between them, each of the unit cells being prepared by laminating a fuel electrode film, a proton-exchange membrane, and an oxidant electrode film in this order, DC power being generated by supplying a fuel gas and an oxidant gas to the stack of unit cells, wherein each separator is obtained from the above-described stainless steel member.

A solid polymer fuel cell having a high performance in generation of energy, a small degradation of cell performance, and a high degree of economic efficiency is provided by using the separator according to the present invention, since the separator does not need costly surface treatment such as gold plating in its preparation.

BEST MODE FOR CARRYING OUT THE INVENTION

Features of the present invention and reasons for the limitations of these features are explained below.

1. Electroconductive Material

Figure 3:
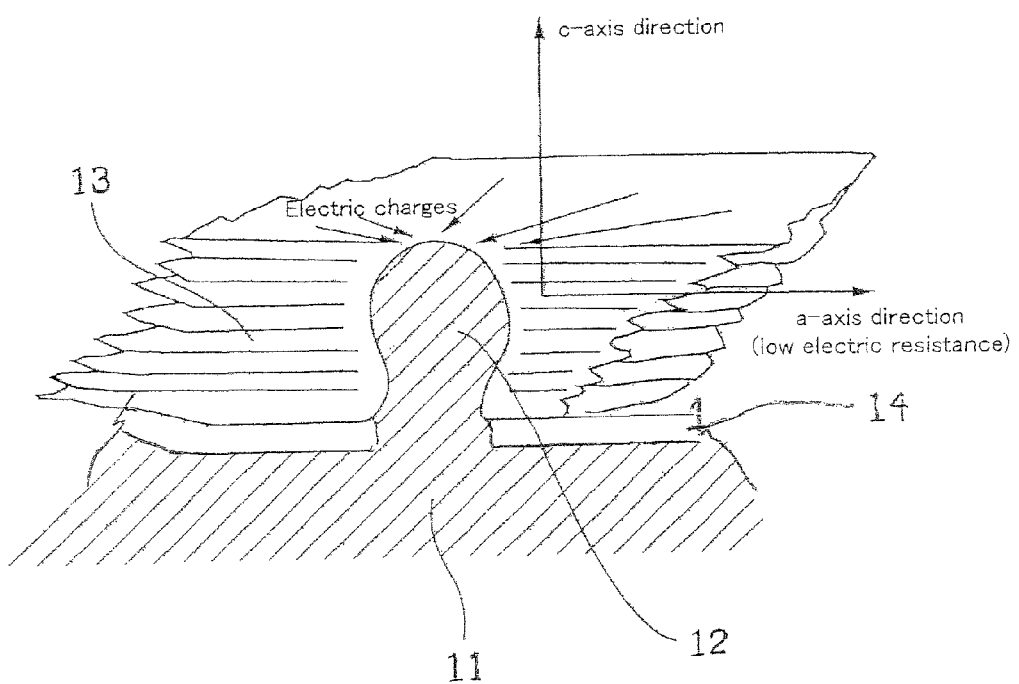
FIG. 3 shows a schematic drawing of the surface of a stainless steel member to which graphic carbon adheres.

Referring to the schematic of FIG. 3, the stainless steel member according to the present invention comprises an electroconductive material 12 which is located so as to electrically contact a stainless steel base metal 11 and to penetrate an oxide film 14 located on the surface of the stainless steel base metal, namely, a passivation film on the stainless steel base metal. This electroconductive material 12 also electrically contacts an electroconductive layer 13 located on the surface of the oxide film 14, the details of which are explained below. The stainless steel base metal 11 and the electroconductive layer 13 are electrically connected with each other through the electroconductive material 12, since the oxide film 14 is located on a part of the surface of the stainless steel base metal 11 where the stainless steel base metal 11 does not electrically contact the electroconductive material 12.

The shape of the part of the surface of the stainless steel base metal where the electroconductive material electrically contacts the stainless steel base metal or the ratio of the part to the whole surface of the stainless steel base metal, or in other words, the pattern formed by the oxide film, namely, passivation film and the electroconductive material located on the stainless steel base metal is not limited. Preferable examples of the pattern include a surface pattern in which the electroconductive materials are discretely located in a matrix of the oxide film. The area of the portions of the surface of the stainless steel base metal where the stainless steel base metal electrically contacts the electroconductive material is preferably small, since an oxide film generally has a higher degree of corrosion resistance than an electroconductive material. However, the contact resistance decreases as the area where the electroconductive material directly contacts the stainless steel base metal increases, since the electroconductive material functions as a charge-collecting point in the present invention, as explained below. Therefore, the area of the portions of the surface of the stainless steel base metal electrically contacting the electroconductive material can be determined depending on the current of charge in the electroconductive material. It is preferable that the electroconductive material be discretely disposed on the oxide film so as to prevent excessive collection of electric current.

There is no limitation on a method of discretely locating the electroconductive materials on the oxide film. Examples of easy processes which can be employed as the method include a process in which electroconductive materials are discretely precipitated in the stainless steel base metal of a stainless steel member in advance, molding of the stainless steel member is then performed to form of a separator, and the electroconductive materials are exposed on the surface of the stainless member by means of pickling or the like. In this method, a passivation film as in the form of an oxide film of the stainless steel member is not formed on the portion of the surface of the stainless steel base metal where the electroconductive material has been exposed. Therefore, the oxide film grows so as to surround the exposed electroconductive material. Accordingly, the electroconductive material is located so as to penetrate the oxide film and to be discretely disposed on the oxide film.

There is no limitation on the composition of an electroconductive material as long as the electroconductive material has (1) a low electric resistance and (2) a high degree of corrosion resistance. Preferable examples of the electroconductive material include a boride-type metallic inclusion which has a $M_2B$-type structure ($M_2B$-type boride). This $M_2B$-type boride is an electroconductive compound formed of boron contained in the stainless steel base metal and metallic elements forming the stainless steel base metal, and the contact resistance between the $M_2B$-type boride and the stainless steel base metal is extremely small. Specific examples of the $M_2B$-type boride include $Fe_2B$, $Cr_2B$, $Ni_2B$, and $Mo_2B$. Examples of the $M_2B$-type boride also include a composite boride having the generic formula $Cr_xNi_yB$ (both x and y are positive numbers, and the sum of x and y is about 2). The $M_2B$-type boride is preferably one containing chromium boride in view of a high hardness, a high electroconductivity, and good properties of an oxide formed on the surface of the stainless steel base metal such as the mechanical strength of the oxide.

There is no limitation on the composition of the stainless steel member in which the $M_2B$-type boride is formed. The stainless steel member may be formed of an austenitic stainless steel, a ferritic stainless steel, or a dual-phase stainless steel. The contents of elements forming the $M_2B$-type boride in the composition of the stainless steel member according to the present invention are preferably higher than the contents of the elements in the composition of a conventional stainless steel member. However, these contents are defined by the relationship with the desired properties such as mechanical properties and corrosion resistance.

Typical examples of the composition of the stainless steel member according to the present invention are shown below.

Examples of the composition of an austenitic stainless steel include a composition comprising C: 0.2% by weight or less, Si: 2% by weight or less, Mn: 3% by weight or less, Al: 0.001 to 6% by weight, P: 0.06% by weight or less, S: 0.03% by weight or less, N: 0.4% by weight or less, Cr: 15 to 30% by weight, Ni: 6 to 50% by weight, B: 0.1 to 3.5% by weight, and a balance consisting of Fe and impurities. The composition may further comprise Cu: 2% or less, W: 5% or less, Mo: 7% or less, V: 0.5% or less, Ti: 0.5% or less, and Nb: 0.5% or less so as to increase mechanical strength, workability, and corrosion resistance.

Examples of the composition of a ferritic stainless steel include a composition comprising C: 0.2% by weight or less, Si: 2% by weight or less, Mn: 3% by weight or less, Al: 0.001 to 6% by weight, P: 0.06% by weight or less, S: 0.03% by weight or less, N: 0.25% by weight or less, Cr: 15 to 36% by weight, Ni: 7% by weight or less, B: 0.1 to 3.5% by weight, and a balance consisting of Fe and impurities. The composition may further comprise Cu: 2% or less, W: 5% or less, Mo: 7% or less, V: 0.5% or less, Ti: 0.5% or less, and Nb: 0.5% or less so as to increase mechanical strength, workability, and corrosion resistance.

Examples of the composition of a dual-phase stainless steel include a composition comprising C: 0.2% by weight or less, Si: 2% by weight or less, Mn: 3% by weight or less, Al: 0.001 to 6% by weight, P: 0.06% by weight or less, S: 0.03% by weight or less, N: 0.4% by weight or less, Cr: 20 to 30% by weight, Ni: 1 to 10% by weight, B: 0.1 to 3.5% by weight, and a balance consisting of Fe and impurities. The composition may further comprise Cu: 2% or less, W: 5% or less, Mo: 7% or less, V: 0.5% or less, Ti: 0.5% or less, and Nb: 0.5% or less so as to increase mechanical strength, workability, and corrosion resistance.

The reasons for limiting the ranges of the contents of the components are as follows. The term "%" with respect to the content of an element means percent by weight.

C is necessary for increasing the mechanical strength of a steel member. The upper limit of C is made 0.2%, since a steel member decreases in machinability when the C content is excessive. The C content is preferably 0.15% or less.

Si is contained as a deoxidizing agent. However, a steel member decreases in ductility when Si is excessively added. In particular, the precipitation of a sigma phase is promoted when a steel member is formed of a dual-phase stainless steel. Therefore, the Si content is made 2% or less.

Mn is added due to its functions such as deoxidizing and fixing S in the form of manganese sulfide or the like. When a steel member is formed of an austenitic stainless steel, Mn contributes to stabilizing the phase of the steel member, since Mn is an austenite stabilizer. The content of Mn is adjusted so as to control the ratio of a ferritic phase when a steel member is formed of a dual-phase stainless steel. However, a stainless steel member decreases in corrosion resistance when the Mn content is excessive. Therefore, the upper limit of the Mn content is made 3%. A preferable range of the Mn content is 2% or less.

P and S are elements which are contained as contaminants and reduce corrosion resistance and hot workability. Therefore, the P content is made 0.06% or less and the S content is made 0.03% or less.

Al is added as a deoxidizing agent to molten steel. The content of oxygen is sufficiently reduced by deoxidizing by Al, since B, which is added to the stainless steel according to the present invention so as to form a $M_2B$-type boride, has a high affinity for oxygen in molten steel. Therefore, the Al content is preferably 0.001 to 6%.

N is an impurity element in a ferritic stainless steel. The upper limit of the N content is preferably 0.25%, since N reduces ductility at room temperature. It is preferable that the N content be smaller, and hence the N content is preferably 0.1% or less. On the other hand, when the stainless steel member is formed of an austenitic or dual-phase stainless steel, N is effective for adjusting the balance of the content of the austenitic phase and for improving the corrosion resistance of the stainless steel member because N is an austenite former. However, workability is reduced when the N content is excessive. Therefore, the upper limit of the N content is preferably 0.4%.

Cr is necessary for improving the corrosion resistance of the stainless steel, and the Cr content must be at least 15% in an austenitic or ferritic stainless steel and at least 20% in a dual-phase stainless steel. When the Cr content is more than 36% in a ferritic stainless steel, mass production of the stainless steel becomes difficult. When the Cr content is more than 30% in an austenitic stainless steel, its austenitic phase becomes unstable even after adjusting the contents of other alloying elements. When the Cr content is more than 30% in a dual-phase stainless steel, a dual phase cannot readily be formed due to an increase in the content of a ferrite phase.

Ni is an austenite stabilizer and is capable of increasing corrosion resistance when a stainless steel member is formed of an austenitic stainless steel. When the Ni content of the austenitic stainless steel member is less than 6%, an austenitic phase becomes unstable. When the Ni content of the austenitic stainless steel member is more than 50%, it is difficult for the stainless steel member to be manufactured. Ni has a function of improving corrosion resistance and ductility when a stainless steel member is formed of a ferritic stainless steel. However, when the Ni content of the ferric stainless steel member is more than 7%, a ferritic phase becomes unstable. Therefore, the upper limit of the Ni content of the ferric stainless steel member is made 7%. Ni also has a function of improving corrosion resistance and ductility when a stainless steel member is formed of a dual-phase stainless steel. Therefore, the Ni content of the dual-phase stainless steel member is preferably 1% or more. However, when the Ni content of the dual-phase stainless steel member is more than 10%, the content of an austenitic phase becomes excessive and the content of a ferritic phase is reduced.

B is important from the viewpoint of forming a $M_2B$-type boride such as $(Cr, Fe)_2B$ and $(Cr, Fe, Ni)_2B$, which mainly contains Cr and Fe, and contains slight amounts of Ni and Mo. This effect of B can be obtained when the B content is 0.1% or more. However, the B content does not readily increase to more than 3.5% with a conventional melting process.

Cu, W, Mo, V, Ti, and Nb are optional added elements for improving strength, corrosion resistance, and the like. The upper limits of these elements are 2%, 5%, 7%, 0.5%, 0.5%, and 0.5%, respectively. When the content of each element increases to more than the above upper limits, the above-described improvement does not increase to an extent commensurate with the increase in the content of each element, and workability is often deteriorated.

There is no limitation on a method of treatment for exposing $M_2B$-type borides on the surface of a stainless steel base metal, which may be referred to below as exposure treatment. Examples of exposure treatment include a method in which $M_2B$-type borides are exposed by selectively dissolving a stainless steel base metal with a solution such as an acid solution which is capable of dissolving the stainless steel base metal but does not readily dissolve borides. Examples of such a solution include a hydrofluoric acid solution, a nitric acid solution, a sulfuric acid solution, a hydrochloric acid solution, a ferric chloride solution, and a mixture of two or more of these solutions. Exposure treatment is preferably performed with an acid solution such as a hydrofluoric acid solution, a nitric acid solution, a sulfuric acid solution, a hydrochloric acid solution, or the like, since elution of metal from a separator during the operation of a fuel cell caused by F or $SO_4^{2-}$ contained in a solid polymer electrolytic membrane is prevented. The reason why such elution is prevented is not clear. One possible reason is thought to be that metals which can be eluted by hydrofluoric acid or sulfuric acid formed during the operation of a fuel cell have been previously dissolved out by exposure treatment.

Since a passivation film is dissolved in exposure treatment, sometimes the passivation film in the form of an oxide film of the stainless steel member for a separator is not sufficiently formed and hence the stainless steel member becomes subject to corrosion. In such a case, it is preferable that passivation treatment with an oxidizing acid such as nitric acid be performed on a stainless steel member after exposure treatment.

Contact resistance sometimes increases after passivation treatment caused by the growth of a surface oxide of the $M_2B$-type boride. In such a case, it is preferable that the stainless steel member be washed with an acid such as sulfuric acid which is less able to dissolve a passivation film which functions as an oxide film so that the surface oxide of the $M_2B$-type boride is selectively dissolved.

2. Electroconductive Layer

The stainless steel member according to the present invention comprises an electroconductive layer which is located on the surface of the oxide film (passivation film), and this electroconductive layer comprises a nonmetallic electroconductive material. Although the electroconductive material consists of an $M_2B$-type boride in the following explanation, the electroconductive material may comprise other materials.

Examples of a nonmetallic electroconductive material of the electroconductive layer include carbon black and an electroconductive paint as described above, and further include electroconductive compounds such as ITO (Indium Tin Oxide) and WC. Graphite carbon is preferable from the viewpoints of high chemical stability, high electroconductivity, and good adhesion to an $M_2B$-type boride.

There is no limitation on the type of graphite. Graphite carbon may be flaky graphite, scale-like graphite, expanded graphite, natural graphite, or synthetic graphite. As explained below, the aspect ratio (diameter/thickness) of graphite is preferably large as in the case of flaky graphite or scale-like graphite so as to utilize the anisotropic electroconductivity of graphite as explained below.

The graphite for covering is required to (1) have a high degree of electroconductivity and to (2) have sufficient corrosion resistance even in an environment containing sulfuric ions and fluoric ions. In addition, the graphite for covering is preferably (3) formed of a soft material so that the graphite can be covered by sliding in a preferable method described below in detail (a method of sliding graphite on a surface consisting of the surface of the oxide film and the surface of the $M_2B$-type boride and abrading graphite by the $M_2B$-type boride so that graphite adheres to the surface of the oxide with the a-axis direction of the adhering graphite parallel to the surface of the oxide film).

From the viewpoint of fulfilling such demands, the crystallinity of graphite is preferably high. The higher is the crystallinity, the softer is the graphite, the higher is the electroconductivity of the graphite, and the higher is the degree of chemical resistance of the graphite both in an acidic environment and a basic environment. Therefore, the possibility of the performance of a fuel cell degrading due to contamination of an MEA membrane caused by the elution of ions becomes low when the crystallinity of graphite is high.

The crystallinity of graphite can be evaluated by the value of the lattice spacing of d002. It is especially preferable that the value of the lattice spacing of d002 of the graphite used in the stainless steel member according to the present invention be 3.390 angstroms or less, since such graphite can fulfill the above-described demands to a high degree.

The graphite on the oxide film is preferably oriented so that the direction having a lower resistance (the a-axis direction) is parallel to the surface of the oxide film (FIG. 3). In this case, electrical charges can be easily transferred in the in-plane direction, since the a-axis direction having a low specific resistance is parallel to the surface of the oxide film.

Therefore, even when a gaseous diffusion electrode layer contacts the separator in a condition in which the gaseous diffusion electrode layer contacts not with an $M_2B$-type boride, which has direct electrical contact with a stainless steel base metal, but with graphite, the electrical charges from the gaseous diffusion electrode layer can quickly transfer to the $M_2B$-type boride via the electroconductive layer having an especially low specific resistance in the in-plane direction. The electric charge can then transfer into a stainless steel base metal, since the $M_2B$-type boride electrically contacts the stainless steel base metal.

Namely, when a gaseous diffusion electrode layer contacts an electroconductive layer which comprises graphite having a high degree of crystallinity and which is present on the surface of a separator, even in a case in which an $M_2B$-type boride does not directly contact the gaseous diffusion electrode layer, the separator can electrically contact the gaseous diffusion electrode layer by the charge-collecting phenomenon from the electroconductive layer to the $M_2B$-type boride.

Such a charge-collecting phenomenon does not occur in a fuel cell using a separator formed of a conventional stainless steel member in which an $M_2B$-type boride is exposed, which is referred to below as a boride composite-stainless steel member without an electroconductive layer. Therefore, the electrical contact between such a separator and a gaseous diffusion electrode layer consists of a plurality of point contacts. In a fuel cell using the separator according to the present invention, the area of electrical contact markedly increases in comparison to this conventional fuel cell, and thus the condition of electrical contact changes from a plurality of point contacts to almost planar contact. As a result of such an excellent state of electrical contact, the surface of the separator according to the present invention has an electric resistance as low as gold plating. Accordingly, the cell performance of a fuel cell using such a separator is as good as the cell performance of a fuel cell using gold plating.

The electric resistance in the in-plane direction of the electroconductive layer containing the nonmetallic electroconductive material according to the present invention is preferably lower than the electric resistance of a gaseous diffusion electrode layer so that the above-described charge-collecting phenomenon effectively occurs. It is thought that the charge-collecting phenomenon effectively occurs in an electroconductive layer which has a structure such that graphite having a lattice spacing of d002 of at most 3.390 angstroms is disposed so that the a-axis direction of the graphite is parallel to the surface of the stainless steel member, since the specific resistance of a gaseous diffusion electrode layer in the in-plane direction is about 0.08 Ωcm, as shown in Table 4-1-15 of "Research Report of Fuel Cell Vehicles 2004" issued by Japan Automobile Research Institute.

The degree of orientation of graphite of the electroconductive layer of the present invention can be evaluated from I(100)/I(004), which is defined as the ratio of the peak intensity of a diffraction line of a (110) atomic plane to the peak intensity of a diffraction line of a (004) atomic plane, both of the intensities being measured by wide-angle X-ray diffraction of the crystal of the graphite of the electroconductive layer.

The details of the method of measuring the intensity of a diffraction line by wide-angle X-ray diffraction are described above.

When this index I(100)/I(004) is less than 0.1, the a-axis direction of the graphite in the electroconductive layer is almost parallel to the surface of the stainless steel member. Thus, it is possible for the low specific resistance of graphite in the a-axis direction (4 to $7 \times 10^{-5}$ Ωcm) to be utilized, namely, for the charge-collecting phenomenon to effectively occur. When the index I(100)/I(004) is less than 0.05, a stainless steel member having excellent electrical properties can be obtained.

In addition to the above-described charge-collecting phenomenon, the high degree of thermal conductivity of graphite in an electroconductive layer is thought to contribute to improving the electroconductivity of a separator.

An electroconductive layer containing graphite has a higher thermal conductivity than a passivation film formed of an oxide. When the crystallinity of the graphite of the electroconductive layer is high and the a-axis direction of the graphite is almost parallel to the surface of the stainless steel member, it is thought that the thermal conductivity of the electroconductive layer in the in-plane direction reaches 100 W/cm or more. Therefore, it is expected that the Joule heat formed at an $M_2B$-type boride due to the charge-collecting phenomenon during operation quickly spreads to the electroconductive layer. Because of this diffusion, the specific resistance of the $M_2B$-type boride caused by the Joule heat or thermal degradation of the $M_2B$-type boride is prevented from increasing, and hence the electroconductivity of a separator is prevented from decreasing.

In a separator formed of a boride composite-stainless steel member without an electroconductive layer, the density of distribution of $M_2B$-type borides exposed on the surface of the member directly relates to the value of contact resistance with a gaseous diffusion electrode layer. Therefore, it is required for the degree of the distribution of $M_2B$-type borides exposing the surface to increase as much as possible.

However, in the stainless steel member according to the present invention, the density of distribution of $M_2B$-type borides exposed on the surface of the stainless steel member and electrically contacting a stainless steel base metal has a smaller effect on the value of contact resistance of a separator and a gaseous diffusion electrode layer due to the charge-collecting phenomenon. Therefore, the freedom of design of the composition of the stainless steel base metal is increased. Specifically, since the amount of borides formed in the stainless steel can be reduced, the stainless steel member increases in workability, and hence the loads in hot rolling and cold rolling in the production of the stainless steel member and the pressing load in the production of the separator can be reduced. In addition, the width of tolerance in the process of forming $M_2B$-type borides such as thermal treatment or in the process of exposing formed borides is expanded. Accordingly, the stainless steel member according to the present invention can be manufactured with increased productivity compared to a boride composite-stainless steel member free of an electroconductive layer.

Since a separator formed of the stainless steel member according to the present invention electrically contacts a gaseous diffusion electrode layer substantially in a state of surface-to-surface contact, the phenomenon in which one of the $M_2B$-type borides functioning as an electrical contact decreases in electroconductivity caused by oxidation or the like has less effect on changing the contact resistance of the separator with time compared to a separator which is formed of a stainless steel without an electroconductive layer and electrically contacts a gaseous diffusion electrode layer in a state of multipoint contact.

The electroconductive layer may be disposed atop $M_2B$-type borides. An electroconductive layer which is so disposed prevents a surface oxide of $M_2B$-type borides from being formed. Therefore, the contact resistance of $M_2B$-type borides with a gaseous diffusion electrode layer is prevented from increasing with time.

There is no limitation on the means for forming the above-described electroconductive layer. The following means is preferable, since the above-explained covering condition of the electroconductive layer is effectively and stably obtained.

First, a substrate comprising a stainless steel base metal in which $M_2B$-type borides are dispersed is prepared by a known process. A specific example of the process is as follows. Raw materials are first heated and melted in a furnace, and the obtained molten steel is then subjected to continuous casting to obtain a slab. The obtained slab is subjected to hot rolling followed by annealing. The annealed steel is then subjected to pickling, cold rolling, and annealing to obtain a substrate formed of stainless steel. The molten steel may be subjected to ingot casting instead of continuous casting. In this case, the obtained ingot may be forged, and the forged material is subjected to hot rolling. Cold rolling may be repeatedly performed, and annealing may be interposed between the multiple instances of cold rolling. A stainless steel member having the shape of a separator may be subjected to annealing (e.g. 700 to 800 degrees C. for several to several tens of hours) so as to ensure the formation of $M_2B$-type borides.

Second, the surface of the substrate formed of stainless steel (including a member given the shape of a separator by a forming process) is physically and/or chemically removed to expose $M_2B$-type borides on its surface. The specific means for exposing is selected from known means based on considerations of the physical and/or chemical properties of the substrate. Specific examples of physical means include surface polishing with a belt grinder. Examples of chemical means include pickling with an aqueous ferric chloride or a mixed aqueous solution containing an aqueous nitric acid and an aqueous hydrofluoric acid. The substrate after treatment for exposing $M_2B$-type borides on the surface has a surface covered with an oxide film except for portions where $M_2B$-type borides are exposed.

Third, a surface consisting of the surface of the oxide film and the surface of $M_2B$-type borides (the surface to be treated) slides on a block of graphite so that the surface layer of the block of graphite is abraded by the $M_2B$-type borides and the abraded graphite adheres to the surface to be treated. When graphite is adhered by the above-described method, graphite is removed by a shear force caused by sliding so that the removed graphite has the shape of a flake. The removed graphite then adheres to the whole surface to be treated including the surface of the exposed $M_2B$-type borides. Since this graphite is flaky, the a-axis direction of the adhering graphite is parallel to the surface to be treated. Therefore, the charge-collecting phenomenon shown in FIG. 3 readily occurs, and a separator having excellent properties is obtained.

The specific means for adhesion of graphite is not limited to the above-described sliding procedure. Other examples include the following procedures.

A substrate is rolled by a rolling machine having a roll formed of graphite with providing back tension on the substrate.

Graphite is compressed to the surface of a substrate by a milling machine having a milling tool consisting of a graphite rod;

The surface of a substrate is brushed with graphite powder; and

The surface of a substrate is rubbing t with graphite powder on a cloth made of felt, for example.

The surface to be treated which consists of the surface of the oxide film and the surface of the boride-type metallic inclusion preferably has an Ra roughness of at least 0.10 micrometers so as to increase the adhesion of the electroconductive layer to the surface to be treated. There is no limitation on the upper limit of the surface roughness from the viewpoint of increasing this adhesion. Since this effect of increasing the adhesion has an upper limit and the adhesion cannot be beyond the upper limit even when the surface roughness excessively increases, the practical range for the surface roughness is 0.1 to 3 micrometers. In addition, the Ra roughness is preferably a tenth or less of the thickness of a stainless steel member from the viewpoint of reducing the possibility of the stainless steel member cracking during a process such as press molding for forming the member into the shape of a separator. When the surface roughness is increased by pickling, the Ra roughness of the surface is generally 2 to 3 micrometers at most. A surface roughness Ra of several tens of micrometers can be achieved when rolling with a dull roll is employed. Surface treatment such as pickling process for exposing $M_2B$-type borides may also be used as a process for providing an appropriate surface roughness on the surface to be treated.

It is sufficient for only a surface of a stainless steel member which faces a gaseous diffusion electrode layer with an assembled fuel cell to have such a surface roughness.

There is no limitation on means for adjusting the surface roughness of the surface to be treated. Examples of the means include the following procedures.

(1) Surface treatment: The surface to be treated is subjected to etching with a known etchant for etching a stainless steel member such as ferric chloride. The content of the etchant, the temperature of a liquid for etching, and the time for etching depend on the amount of etching.

(2) Grinding with a belt grinder: The surface to be treated is subjected to grinding with a belt grinder in which abrasives such as diamond, silicon carbide, and alumina are embedded to adjust the surface roughness.

(3) Controlling the surface roughness by adjusting the surface roughness of a mill roll: The surface roughness of a mill roll is adjusted by changing the degree of grinding for finishing the mill roll.

3. Adhesive Agent

Since an adhesive agent does not have electroconductivity as explained above, when an adhesive agent is used to cover with graphite, the resulting electroconductive layer increases in contact resistance. Therefore, ideally an adhesive agent is not used in the process of forming an electroconductive layer on a surface to be treated. In addition, when a stainless steel member is covered with graphite having a lattice spacing of d002 of at most 3.390 angstroms by the above-described preferred method, a separator formed from the stainless steel member is assembled into a conventional fuel cell, and the assembled fuel cell is operated in a conventional condition, the separator is almost free of problems such as the electroconductive layer being removed during the operation of the fuel cell.

However, an adhesive agent may be used in the process of forming an electroconductive layer containing graphite when a fuel cell is operated in a severe condition and hence a higher degree of adhesion of the electroconductive is required.

In a general process for forming an electroconductive layer containing graphite and an adhesive agent, a paint prepared by mixing graphite and an adhesive agent is applied. However, when employing the above-described process in which the surface of a substrate formed of stainless steel or a member having the shape of a separator by a forming process slides on a block of graphite so that graphite adheres to the surface of the substrate or the member, it is preferable that the surface to be treated be first coated with an adhesive agent and then the surface be covered with by sliding.

The above-described covering by sliding is thought to include the following phenomena.

The $M_2B$-type borides projecting from the surface to be treated on which the adhesive agent is applied abrade the graphite of the block.

The adhesive agent on the surface to be treated is removed from the surface to be treated due to the block of graphite sliding on the surface to be treated.

The worn graphite and the removed adhesive agent mix in the space between the surface to be treated and the block of graphite.

The mixture of the worn graphite and the removed adhesive agent in the space between the surface to be treated and the block of graphite adheres to the surface to be treated to form the electroconductive layer.

In addition, it is thought that a phenomenon in which the graphite abraded from the block of graphite directly adheres to the surface to be treated to form the electroconductive layer occurs at the same time.

Therefore, it is thought that the electroconductive layer has a higher content of the adhesive agent in a portion close to the interface with the surface to be treated and a higher content of graphite in a portion close to the surface of the electroconductive layer. It is easy to see that a separator comprising an electroconductive having such a structure is superior both in adhesion to the electroconductive layer and in the contact resistance with a gaseous diffusion electrode layer.

In a surface to be treated, the surface of the $M_2B$-type boride slides more severely on the block of graphite than the surface of the oxide film. Therefore, the adhesive agent atop the surface of the $M_2B$-type boride is more easily removed during sliding on the block of graphite than the adhesive agent on the surface of the oxide film. Thus, the electroconductive layer on the surface of the $M_2B$-type boride has a lower content of the adhesive agent and a higher content of graphite in comparison to the electroconductive layer on the surface of the oxide film. Accordingly, it is expected that the contact resistance of the electroconductive layer at the surface of the $M_2B$-type boride is relatively low.

There is a possibility of the adhesion of the electroconductive layer at the surface of the $M_2B$-type boride being relatively low while the electroconductivity is relatively high, since the content of the adhesive agent is relatively low. However, the electroconductive layer on the surface of the oxide film which is continuously formed at the periphery of the electroconductive layer on the surface of the $M_2B$-type boride relatively strongly adheres to the surface of the oxide layer, since the electroconductive layer on the surface of the oxide film has an increased content of the adhesive agent compared to the electroconductive layer on the surface of the $M_2B$-type boride. Therefore, the electroconductive layer on the surface of the $M_2B$-type boride is held by the electroconductive layer on the surface of the oxide film, and hence the electroconductive layer on the surface of the $M_2B$-type boride is not readily removed.

Accordingly, a separator having a low initial value of contact resistance and a small change in contact resistance with time can be obtained even though an adhesive agent is used.

Even when such a process in which coating with an adhesive agent is previously carried out is employed, a surface to be treated is preferably coated with a coating composition comprising graphite and an adhesive agent in an amount of at most 2% by weight of the amount of graphite in the composition. When the amount of the adhesive agent is more than 2% by weight of the amount of graphite in the coating composition, the electroconductive layer increases in electric resistance, and hence there is a possibility of the electrical output of a fuel cell falling due to an increase in the calorific loss of the fuel cell due to joule heat.

There is no limitation on the specific type of adhesive agent, as long as the adhesive agent has superior water resistance, oxidation resistance, and chemical resistance. An adhesive agent containing a fluororesin such as PTFE (polytetrafluoroethylene) and PVDF (polyvinylidene fluoride), which is also used for forming a catalyst layer of a fuel cell, is preferable, and PTFE is most preferable.

Example 1

Examples for illustrating the superiority of the present invention are shown below. While the nonmetallic electroconductive material in the following examples comprises graphite, the nonmetallic electroconductive material need not comprise graphite as long as the material has low electric resistance.

1. Preparation of a Member Formed of Stainless Steel
  (1) Preparation of a Stainless Steel Plate Each of ten different stainless steels having the chemical composition shown in Table 1 was melted in a 150 kg-vacuum furnace which could heat steel by high-frequency induction heating to obtain an ingot. The character "A" in the column for steel type in Table 1 means an austenitic stainless steel, and the character "F" in the column means a ferritic stainless steel.

TABLE 1

| | Chemical composition (% by weight, balance consisting of Fe and inevitable impurities) | | | | | | | | | | | | | | |
|---|---|---|---|---|---|---|---|---|---|---|---|---|---|---|---|
| Material | C | Si | Mn | P | S | Cu | Cr | Ni | Mo | V | Al | N | B | Steel type | Precipitation |
| material 1 | 0.022 | 0.350 | 1.00 | 0.022 | 0.001 | 0.45 | 21.00 | 11.00 | 2.20 | — | 0.010 | 0.025 | 0.450 | A | boride |
| material 2 | 0.020 | 0.400 | 1.00 | 0.015 | 0.001 | 0.45 | 26.50 | 20.00 | 2.20 | — | 0.025 | 0.015 | 0.420 | A | boride |
| material 3 | 0.018 | 0.500 | 1.50 | 0.018 | 0.002 | 0.30 | 24.50 | 24.50 | 4.50 | — | 0.025 | 0.015 | 0.450 | A | boride |
| material 4 | 0.040 | 0.320 | 0.28 | 0.023 | 0.001 | 0.04 | 18.20 | 0.02 | 0.99 | 0.010 | 0.008 | 0.008 | 0.370 | F | boride |
| material 5 | 0.030 | 0.290 | 0.29 | 0.021 | 0.001 | 0.02 | 21.20 | 0.03 | 1.55 | 0.010 | 0.011 | 0.005 | 1.550 | F | boride |
| material 6 | 0.003 | 0.150 | 0.10 | 0.018 | 0.002 | 0.15 | 24.80 | 0.20 | 1.60 | — | 0.025 | 0.006 | 0.420 | F | boride |
| material 7 | 0.020 | 0.500 | 1.00 | 0.018 | 0.002 | 0.30 | 17.50 | 12.20 | 2.20 | — | 0.025 | 0.015 | 0.000 | A | no precipitation |
| material 8 | 0.020 | 0.400 | 1.00 | 0.022 | 0.001 | 0.45 | 25.00 | 20.00 | 2.20 | — | 0.025 | 0.015 | 0.000 | A | no precipitation |
| material 9 | 0.030 | 0.150 | 0.10 | 0.018 | 0.002 | 0.15 | 19.00 | 0.20 | 2.20 | — | 0.025 | 0.006 | 0.000 | F | no precipitation |
| material 10 | 0.003 | 0.150 | 0.10 | 0.018 | 0.002 | 0.15 | 22.30 | 0.20 | 1.60 | — | 0.025 | 0.006 | 0.000 | F | no precipitation |

The compositions of materials 1, 2, 7, and 8 were designed so as to have the following characteristics.

The composition of material 1 was based on the composition of material 7 and modified so that $Cr_2B$-type borides were precipitated. Specifically, the composition of material 1 comprised B and had an increased Cr content for forming borides.

The composition of material 2 was based on the composition of material 8 and modified so that $Cr_2B$-type borides were precipitated. Specifically, the composition of material 2 comprised B and had an increased Cr content for forming borides.

Each of the obtained ingots was subjected to hot forging, cutting, hot rolling, annealing, cold rolling, intermediate annealing, cold rolling, and annealing in this order to obtain a cold-rolled steel plate, each process condition being shown in Table 2.

The sheet member obtained by above-described surface treatment is referred to below as a sheet member for a separator.

2. Method for Measuring Contact Resistance

Figure 2:
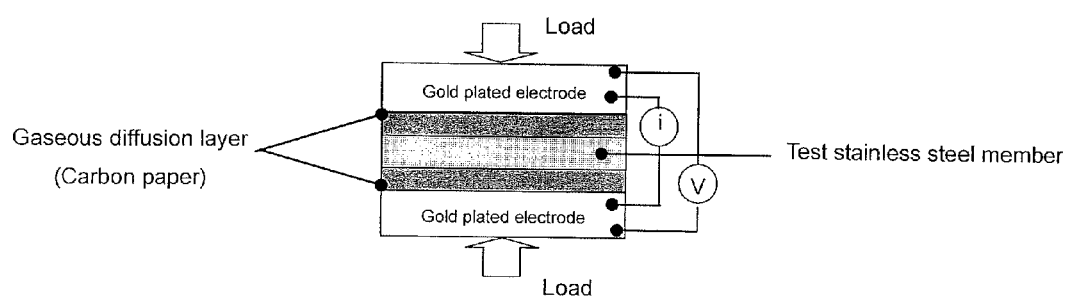
FIG. 2 shows the principle of measuring contact resistance.

Contact resistance was measured with the equipment schematically shown in FIG. 2 in compliance with a method reported in literature such as Titan Vol. 54, No. 4, P 259. A sheet member for a separator was sandwiched between sheets of carbon paper (TGP-H-90, produced by Toray Industries, Inc.) which each had an area of 1 $cm^2$ and which were used as gaseous diffusion electrode layers. This structure consisting of carbon paper and a separator was then sandwiched between electrodes plated with gold. A load of 5 $kgf/cm^2$ or 20 $kgf/cm^2$ was applied at the ends of the gold-plated electrodes, and an electric current was then passed between the electrodes. The voltage drop between the carbon paper and the sheet member for a separator was measured, and the contact resistance

TABLE 2

| Material | Forging | | | Hot rolling | | | |
| | Heating temperature | Length | Size | Heating temperature | Length | Size | Annealing |
| --- | --- | --- | --- | --- | --- | --- | --- |
| material 1 | 1180° C. | 3 hours | Φ250→40 t | 1180° C. | 2 hours | 40→6 t | 1180° C. × 1 hr |
| material 2 | 1180° C. | 3 hours | Φ250→40 t | 1180° C. | 2 hours | 40→6 t | 1180° C. × 1 hr |
| material 3 | 1180° C. | 3 hours | Φ250→40 t | 1180° C. | 2 hours | 40→6 t | 1180° C. × 1 hr |
| material 4 | 1180° C. | 3 hours | Φ250→40 t | 1180° C. | 2 hours | 40→6 t | 1180° C. × 1 hr |
| material 5 | 1180° C. | 3 hours | Φ250→40 t | 1180° C. | 2 hours | 40→6 t | 1180° C. × 1 hr |
| material 6 | 1180° C. | 3 hours | Φ250→40 t | 1180° C. | 2 hours | 40→6 t | 1180° C. × 1 hr |
| material 7 | 1220° C. | 3 hours | Φ250→40 t | 1220° C. | 2 hours | 40→6 t | 1180° C. × 1 hr |
| material 8 | 1220° C. | 3 hours | Φ250→40 t | 1220° C. | 2 hours | 40→6 t | 1180° C. × 1 hr |
| material 9 | 1220° C. | 3 hours | Φ250→40 t | 1220° C. | 2 hours | 40→6 t | 1180° C. × 1 hr |
| material 10 | 1220° C. | 3 hours | Φ250→40 t | 1220° C. | 2 hours | 40→6 t | 1180° C. × 1 hr |

| Material | Cold rolling | | | | | |
| | 1st rolling | Intermediate annealing | 2nd rolling | Intermediate annealing | 3rd rolling | Annealing |
| --- | --- | --- | --- | --- | --- | --- |
| material 1 | 6→3.2 t | 1080° C. × 10分 | 3.2→1.6 t | 1080° C. × 10分 | 1.6→0.3 t | 1080° C. × 10分 |
| material 2 | 6→3.2 t | 1080° C. × 10分 | 3.2→1.6 t | 1080° C. × 10分 | 1.6→0.3 t | 1080° C. × 10分 |
| material 3 | 6→3.2 t | 1080° C. × 10分 | 3.2→1.6 t | 1080° C. × 10分 | 1.6→0.3 t | 1080° C. × 10分 |
| material 4 | 6→3.2 t | 1080° C. × 10分 | 3.2→1.6 t | 1080° C. × 10分 | 1.6→0.3 t | 1080° C. × 10分 |
| material 5 | 6→3.2 t | 1080° C. × 10分 | 3.2→1.6 t | 1080° C. × 10分 | 1.6→0.3 t | 1080° C. × 10分 |
| material 6 | 6→3.2 t | 1080° C. × 10分 | 3.2→1.6 t | 1080° C. × 10分 | 1.6→0.3 t | 1080° C. × 10分 |
| material 7 | 6→3.2 t | 1080° C. × 10分 | 3.2→1.6 t | 1080° C. × 10分 | 1.6→0.3 t | 1080° C. × 10分 |
| material 8 | 6→3.2 t | 1080° C. × 10分 | 3.2→1.6 t | 1080° C. × 10分 | 1.6→0.3 t | 1080° C. × 10分 |
| material 9 | 6→3.2 t | 1080° C. × 10分 | 3.2→1.6 t | 1080° C. × 10分 | 1.6→0.3 t | 1080° C. × 10分 |
| material 10 | 6→3.2 t | 1080° C. × 10分 | 3.2→1.6 t | 1080° C. × 10分 | 1.6→0.3 t | 1080° C. × 10分 |

The cold-rolled steel plates obtained in the above-described processes were pickled with a solution containing 7% by weight of nitric acid and 4% of hydrofluoric acid at a temperature of 60 degrees C. An oxide scale which was formed at a high temperature on the surface of the obtained steel plate was removed to obtain a sheet member having a thickness of 0.3 mm.

(2) Surface Treatment for Exposing Borides

The obtained sheet member was subjected to the following surface treatment so as to expose borides and to adjust the surface roughness.

Raw materials of a surface treatment liquid: ferric chloride anhydride, which is a product of Wako Pure Chemical Industries, Ltd., and water.

Surface treatment liquid: an aqueous ferric chloride having a Baume scale of 45.

Surface treatment conditions: A sheet was immersed in the surface treatment liquid at 60 degrees C. for 40 seconds.

Washing and drying conditions: A sheet after surface treatment was sufficiently washed with running water, and the sheet after washing was sufficiently dried in an oven at a temperature of 70 degrees C.

between the carbon paper and the sheet member for a separator was obtained based on the measured voltage drop. The obtained contact resistance was the sum of the values of contact resistance at both surfaces of the sheet member for a separator, and hence the obtained value was divided by 2 to obtain the contact resistance per surface of the gaseous diffusion electrode layer.

The voltage drop and the current were measured with a digital multimeter (KEITHELEY 2001 manufactured by TOYO Corporation).

3. Investigation of Corrosion Resistance in a Simulated Cell Environment

A sheet member for a separator was immersed in an aqueous sulfuric acid solution having a pH of 2 at 90 degrees C. for 96 hours, followed by washing with a sufficient amount of water and drying. The dried sheet member for a separator was subjected to the above-described measurement of contact resistance. When the corrosion resistance of a sheet member for a separator is not sufficient, a passivation film is formed on the surface of the sheet member after the immersion, and hence the sheet member after the immersion increases in contact resistance in comparison to the sheet member before the immersion.

4. Measurement of Lattice Spacing of Covering Graphite Carbon

The lattice spacing of the graphite used for covering was measured by the 2θ/θ scan method with an instrument for X-ray diffraction measurement (RINT 2000 produced by Rigaku Corporation). The base line and profiles were corrected by adding a standard Si in an amount of 20% by weight to obtain the lattice spacing of d002, namely the lattice spacing between C-planes, this procedure being compliant with the method agreed upon by the 117th Committee of Japan Society for the Promotion of Science. The lattice spacing was calculated with a program for analyzing the X-ray diffraction of carbon material (Carbon-X version 1.4.2 produced by Realize Science & Engineering Center Co., Ltd.).

When graphite was applied by sliding, a block of graphite was subjected to measurement of X-ray diffraction. When graphite was applied by coating, the graphite used for a coating composition was subjected to measurement of X-ray diffraction. When graphite was applied by vacuum deposition, it was difficult for the deposited graphite to be measured as is. Therefore, a sample for X-ray diffraction measurement was prepared by depositing graphite having a thickness such that the peak of d002 was clearly observed in the obtained sample.

5. Evaluation of Fuel Cell

A solid polymer fuel cell for evaluation was prepared based on a commercial cell (EFC 50 produced by ElectroChem, Inc.).

A stainless separator used in the cell is described in detail below.

Figure 1:
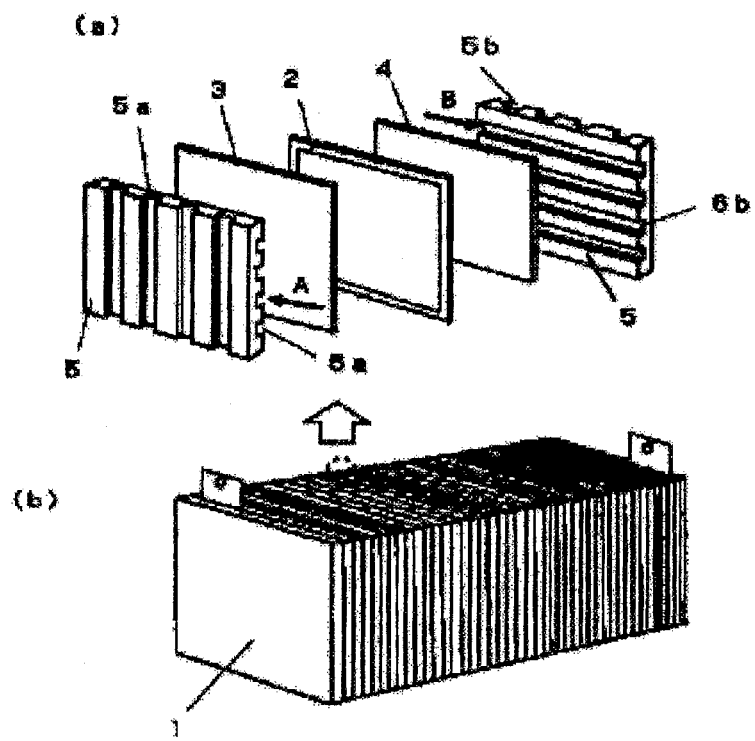
FIG. 1 schematically shows the structure of a solid polymer fuel cell.

A sheet member for a separator was subjected to press molding at both of its surfaces (anode side and cathode side) to form a separator having a passageway for gas with a width of 2 mm and a depth of 1 mm as shown in FIG. 1. The resulting separator was then subjected to the surface treatment shown in the Examples. The separator after surface treatment was assembled to form a solid fuel cell having a single cell. This single cell was subjected to the evaluations in the Examples, since the result of evaluation of a fuel cell having plural cells varies depending on the conditions of stacking the cells.

Hydrogen gas with a purity of 99.9999% was used as a fuel gas at the anode side and air was used for the gas at the cathode side. The entire cell body was maintained at a temperature of 70±2 degrees C. The humidity inside the cell was adjusted by supplying a gas having a dew point of 70 degrees C. as the gas at the cathode side. The pressure inside the cell was 1 atm.

The input pressures of hydrogen gas and air into the call were adjusted to be 0.04 to 0.20 bar. The evaluation of the performance of the cell started after a condition in which the cell voltage reached 0.62±0.04 V per single cell at 0.5 A/cm$^2$ was measured.

The following evaluations were performed with the above-described single cell.

(1) Initial Cell Voltage

The measurement of the voltage of the single cell started when the current density in a single cell reached 0.5 A/cm$^2$ after supplying the fuel gas. The initial cell voltage was defined by the highest value of the measured cell voltage during the first 48 hours after the measurement started.

(2) Degree of Degradation of Cell

The degree of degradation of the cell was defined as follows by using the value of the cell voltage measured 500 hours after the initial cell voltage was measured, which is referred to below as the cell voltage after 500 hours.

The degree of degradation={cell voltage after 500 hours($V$)−initial cell voltage($V$)}/500 hours 6. Measurement of Adhesion of Graphite Carbon The degree of adhesion of an electroconductive layer formed on the surface of a sheet member of a separator was measured by a peeling test in which a coating having a grid cut therein was peeled with adhesive tape in compliance with JIS D0202-1998. An electroconductive layer was adhered to an adhesive cellophane tape (CT 24 produced by Nichiban Co., Ltd.) by pressing the tape against the electroconductive layer with the ball of a finger and then peeling the tape. The number of remaining portions in the grid out of the total of 100 (10×10) prepared portions in the grid was counted. The degree of adhesion was evaluated by the number of remaining portions in the grid. A case in which all of the prepared portions in the grid remained without peeling is indicated as "100/100". A case in which all of the prepared portions in the grid were peeled off is indicated as "0/100".

The effectiveness of the present invention was evaluated by comparing it with the prior art. The evaluation results are shown in Table 3.

Conventional methods 1 to 11 which were performed to evaluate conventional inventions are described below.

Conventional Method 1

A sheet member for a separator was subjected to the above-described surface treatment so as to adjust the surface roughness of the member.

Conventional Method 2

A material corresponding to SUS 316L was subjected to degreasing, washing, surface activation, and rinsing in this order. Surface portions of the obtained material corresponding to surfaces contacting electrodes of a unit cell, namely portions contacting with gaseous diffusion electrode layers, were further subjected to gold plating. The thickness of plated gold was 0.05 micrometers.

Conventional Methods 3 and 4

A sheet member for a separator was pickled for 10 seconds with aqueous hydrochloric acid (10% by weight) at 60 degrees C. A paint obtained by mixing 100 parts by weight (MCMB produced by Osaka Gas Co., Ltd.; mean diameter of 6 micrometers) of graphite powder with an aqueous paint in an amount of 35 parts by weight, in which a polyolefin and a water-dispersible carbon black were dispersed, was applied to a thickness of 30 micrometers, followed by baking for 1 hour at 120 degrees C.

Conventional Methods 5 and 6

A paint was obtained by mixing 14.4 parts by weight (MCMB produced by Osaka Gas Co., Ltd.; mean diameter of 6 micrometers) of graphite powder, 3.6 parts by weight of carbon black, 2.0 parts by weight of an adhesive agent consisting of a copolymer of vinylidene fluoride and hexafluoropropylene, and 80 parts by weight of a solvent of NMP, followed by kneading the mixture. The obtained paint was coated on both surfaces of a sheet member for a separator with a doctor blade, and the resulting sheet member was dried for 15 minutes at 150 degrees C.

Conventional Methods 7 and 8

A test sample for evaluation was obtained by depositing amorphous carbon on a sheet member for a separator by an ion-beam deposition method with a target of graphite.

Conventional Method 9

A sheet member for a separator having a thickness of 0.3 mm, which had been subjected to the above-described processes until pickling, was subjected to the fourth condition disclosed in Examples of Patent Document 7, namely, treatment with an aqueous liquid containing 8% of nitric acid and 4% of hydrofluoric acid at 60 degrees C., to obtain a sheet member surface on which an electroconductive material consisting of a $M_2B$-type boride was precipitated.

Conventional Method 10

In order to evaluate the material disclosed in Patent Document 5, an experiment pursuant to Example 1 of Patent Document 5 was performed. Graphite powder having an average diameter of about 3 micrometers (SGP produced by SEC Carbon, Ltd.) was sprinkled on felt. The surface of a sheet member of SUS 316L, which was a commercially available austenitic stainless steel sheet was rubbed with the felt having graphite powder on its surface. About 6 mg/cm² of graphite adhered to the stainless steel member. The resulting stainless steel sheet was rolled with a rolling reduction of 3%. The stainless steel sheet after rolling was then subjected to heating to 700 degrees C. and was held for 10 seconds at this temperature.

Conventional Method 11

In order to evaluate the material disclosed in Patent Document 6, an experiment pursuant to Example 6 of Patent Document 6 was performed. A layer of chromium oxide having a thickness of several micrometers was formed by sputtering on a sheet member of SUS 316L, which was a commercially available austenitic stainless steel sheet. An aqueous liquid in which a copolymer of tetrafluoroethylene and hexafluoropropylene was dispersed was kneaded with flaky graphite, and a portion of the water was evaporated from the resulting material to obtain a resin composition. The ratio by weight of the flaky graphite and the resin-based component of this resin composition was 50:10. This resin composition was coated on the SUS 316L member after sputtering, and the resulting member was dried for 90 minutes at 150 degrees C.

Test samples for evaluation so as to confirm the superiority of the present invention was prepared as described below.

Examples 1, 4, and 7 of Present Invention

The surfaces of a sheet member for a separator on which $M_2B$-type borides were precipitated and which would contact gaseous diffusion electrode layers during the operation of a fuel cell were covered with graphite by sliding a block of graphite having a rectangular contact surface measuring 100 mm by 100 mm on the sheet member. The block of graphite was a product of Toyo Tanso Co., Ltd. and the graphite had a lattice spacing d002 of 3.36 angstroms.

Examples 2 and 6 of Present Invention

The surfaces of a sheet member for a separator on which $M_2B$-type borides were precipitated and which would contact gaseous diffusion electrode layers during the operation of a fuel cell were coated with a paint composition obtained by 15-fold dilution of a liquid dispersion of PTFE (POLYFLON D1 produced by Daikin Industries, Ltd.) with pure water. The resulting sheet member was dried to form coating films on the surfaces of the sheet member for a separator. Each of the surfaces of this sheet member having the coating films was then made to slide on a block of graphite having a rectangular contact surface measuring 100 mm by 100 mm, so that the surface of the sheet member for a separator was covered with an adhesive agent and graphite. The block of graphite was a product of Toyo Tanso Co., Ltd. and the graphite in the block has a lattice spacing d002 of 3.36 angstroms.

Examples 5 and 8 of Present Invention

Graphite powder, which was produced by Chuetsu Graphite Works Co., Ltd. and had a flaky shape, an average diameter of 10 micrometers, and a lattice spacing of 3.36 angstroms, was disposed on surfaces of a sheet member for a separator on which $M_2B$-type borides were precipitated and which surfaces would contact gaseous diffusion electrode layer during the operation of a fuel cell. The surfaces of the sheet member for a separator on which the graphite powder was disposed were pressed with a pressure of 150 kgf/cm² so that the graphite powder adhered to the surfaces of the sheet member.

Example 3 of Present Invention

The surfaces of a sheet member for a separator on which $M_2B$-type borides were precipitated and which would contact gaseous diffusion electrode layers during the operation of a fuel cell were subjected to vacuum deposition of graphite with a vacuum deposition instrument (AAH-C1080SB produced by Sinko Seiki Co., Ltd.). The processing time was made 20 minutes so that the thickness of deposited graphite was 1500 angstroms. It was impossible for the lattice spacing of the deposited graphite on the surface of the sheet member for a separator to be measured by the X-ray diffraction method, since the thickness was merely 1500 angstroms. Therefore, a stainless steel sheet which was subjected to the vacuum deposition for 3 hours was prepared, and the graphite formed on this stainless steel was subjected to the X-ray diffraction method.

TABLE 3

| | Material | Method | Lattice spacing d002 Å | Initial contact resistance (mΩ·cm²) 5 kgf/cm² | Initial contact resistance (mΩ·cm²) 20 kgf/cm² | Contact resistance after corrosion test (mΩ·cm²) 5 kgf/cm² | Contact resistance after corrosion test (mΩ·cm²) 20 kgf/cm² | Initial cell voltage at 0.5 A/cm² (V) | Degree of degradation (μV/hr) | Process cost |
|---|---|---|---|---|---|---|---|---|---|---|
| Conventional method 1 | material 7 | just surface treatment | — | 25 | 12 | 75 | 38 | 0.64 | −7.8 | — |
| Conventional method 2 | material 7 | method of JP10-228914A | — | 4.1 | 2.1 | 5.1 | 2.6 | 0.7 | −1.8 | high |
| Conventional method 3 | material 7 | method of JP11-345618A | — | 48 | 22 | 51 | 23 | 0.63 | −4.5 | — |
| Conventional method 4 | material 8 | method of JP11-345618A | — | 51 | 26 | 57 | 28.5 | 0.62 | −4.5 | — |
| Conventional method 5 | material 7 | method of WO2003/044888 | — | 27 | 13 | 38 | 18 | 0.65 | −4.6 | — |
| Conventional method 6 | material 9 | method of WO2003/044888 | — | 32 | 14.7 | 53.8 | 34.2 | 0.64 | −4.7 | — |
| Conventional method 7 | material 7 | method of JP2000-67881A | — | 44 | 20.4 | 43.5 | 20.8 | 0.62 | −2.1 | — |
| Conventional method 8 | material 10 | method of JP2000-67881A | — | 45 | 20.8 | 46 | 20.9 | 0.62 | −2.1 | — |
| Conventional method 9 | material 1 | method of JP 3365385B | — | 17 | 3.1 | 25 | 12 | 0.69 | −4.4 | — |
| Conventional method 10 | material 7 | method of WO99/19927 | — | 34 | 10.1 | 59.2 | 39.2 | 0.63 | −4.9 | — |

TABLE 3-continued

| | Material | Method | Lattice spacing d002 Å | Initial contact resistance (mΩ·cm²) 5 kgf/cm² | Initial contact resistance (mΩ·cm²) 20 kgf/cm² | Contact resistance after corrosion test (mΩ·cm²) 5 kgf/cm² | Contact resistance after corrosion test (mΩ·cm²) 20 kgf/cm² | Initial cell voltage at 0.5 A/cm² (V) | Degree of degradation (μV/hr) | Process cost |
|---|---|---|---|---|---|---|---|---|---|---|
| Conventional method 11 | material 7 | method of WO2001/18895 | — | 40.2 | 16.4 | 43.4 | 19.4 | 0.62 | −2.1 | — |
| Present Invention 1 | material 1 | sliding | 3.36 | 13 | 2.8 | 16 | 2.9 | 0.7 | −1.3 | — |
| Present Invention 2 | material 1 | coating with adhesive agent | 3.36 | 19 | 3.88 | 19 | 3.91 | 0.68 | −1.4 | — |
| Present Invention 3 | material 2 | vacuum deposition | 3.375 | 26 | 9.8 | 29 | 9.9 | 0.68 | −1.8 | — |
| Present Invention 4 | material 2 | sliding | 3.36 | 12 | 2.7 | 13.2 | 3.1 | 0.7 | −1.4 | — |
| Present Invention 5 | material 3 | press | 3.36 | 13 | 3.1 | 14.1 | 3.2 | 0.69 | −1.5 | — |
| Present Invention 6 | material 4 | coating with adhesive agent | 3.36 | 19.2 | 4.11 | 19.8 | 4.13 | 0.68 | −1.7 | — |
| Present Invention 7 | material 5 | sliding | 3.36 | 13.2 | 3.2 | 14.4 | 3.22 | 0.69 | −1.5 | — |
| Present Invention 8 | material 6 | press | 3.36 | 15.1 | 3.3 | 15 | 3.25 | 0.69 | −1.4 | — |

In the results for each of examples 1 to 8 of the present invention, both the initial contact resistance measured in a condition in which 20 kgf/cm² was applied and the contact resistance after a corrosion test was at most 10 mΩ cm². This contact resistance was less than the initial contact resistance and the contact resistance after a corrosion test of examples of conventional methods 1, and 3 to 9. Increases in contact resistance caused by a corrosion test of the examples of the present invention were relatively small. These results show that the stainless steel according to the present invention has a high corrosion resistance. Although the contact resistance of the example of conventional method 2 was small, that method employs gold plating which is an expensive process and hence it has the problem of low economic efficiency and large consumption of a scarce resource.

The initial voltage of each of the examples 1 to 8 of the present invention was 0.68 V or more. This initial voltage was higher than the initial voltages obtained in the examples of conventional methods 1, 3, 4, 5, 6, 7, 8, 9, 10, and 11.

The degree of degradation of a cell of the examples 1 to 8 of the present invention was −2.0 microV/hour or more, which was better than the degrees of degradation of the examples of conventional methods 1, and 3 to 11. Although the degree of degradation of the example of conventional method 2 was small, that method has the problem i of low economic efficiency and large consumption of a scarce resource as described above. The examples of conventional methods 7 and 8 have the problems that the initial cell voltage is low and that a separator is costly due to a poor ability to be mass produced.

When the examples 1 to 8 of the present invention are compared to the example of conventional method 9, all of the examples of the present invention have properties such that borides are precipitated on the surface of a sheet member for a separator, the value of contact resistance after a corrosion test and the degree of degradation are significantly improved.

Example 2

This example was performed for the purpose of ascertaining the features of preferred embodiment of the present invention, in particular a preferable range of the lattice spacing of graphite which covers borides on the surface of a stainless steel sheet.

Small particles of a mesophase formed by heat treatment of petroleum pitch and a bulk mesophase which was a matrix of the small particles were subjected to carbonization by heat to obtain a carbonaceous material. Various graphites having different lattice spacings were prepared from the obtained carbonaceous material by being subjected to graphitization by heat under different conditions in which the temperatures and/or times for heating varied.

The heating times and obtained lattice spacings are shown in Table 4. Graphites 1 to 3 in Table 4 were out of the preferable range and Graphites 4 to 9 were within the preferable range.

TABLE 4

| | Heating temperature (° C.) | Heating time (hour) | Lattice spacing d002 (Å) |
|---|---|---|---|
| Graphite 1 | 2000 | 0.5 | 3.400 |
| Graphite 2 | 2200 | 0.5 | 3.395 |
| Graphite 3 | 2400 | 0.5 | 3.392 |
| Graphite 4 | 2500 | 1 | 3.385 |
| Graphite 5 | 2600 | 1 | 3.370 |
| Graphite 6 | 2700 | 1 | 3.365 |
| Graphite 7 | 2800 | 1 | 3.362 |
| Graphite 8 | 2900 | 1.5 | 3.360 |
| Graphite 9 | 3000 | 1.5 | 3.356 |

The surfaces of a sheet member for a separator formed of material 1 on which $M_2B$-type borides were precipitated and which would contact gaseous diffusion electrode layers during the operation of a fuel cell were made to slide on one of the 9 different graphites shown in Table 4 to cover the surfaces of the sheet member with graphite. The members covered with graphite were evaluated, and the results of evaluation are shown in Table 5.

TABLE 5

|  | Material | Method | Lattice spacing d002 (Å) | Initial contact resistance (mΩ·cm$^2$) | | Contact resistance after corrosion test (mΩ·cm$^2$) | | Initial cell voltage at 0.5 A/cm$^2$ (V) | Degree of degradation (μV/hr) |
| --- | --- | --- | --- | --- | --- | --- | --- | --- | --- |
|  |  |  |  | 5 kgf/cm$^2$ | 20 kgf/cm$^2$ | 5 kgf/cm$^2$ | 20 kgf/cm$^2$ |  |  |
| Present Invention 17 | material 1 | sliding | 3.400 | 49 | 27 | 55 | 32 | 0.63 | −3.8 |
| Present Invention 18 | material 1 | sliding | 3.395 | 32 | 21 | 33.4 | 21.3 | 0.65 | −3.5 |
| Present Invention 19 | material 1 | sliding | 3.392 | 29 | 15.3 | 31 | 15.5 | 0.66 | −3.1 |
| Present Invention 9 | material 1 | sliding | 3.385 | 23 | 8.7 | 23.4 | 8.8 | 0.68 | −1.9 |
| Present Invention 10 | material 1 | sliding | 3.370 | 19.2 | 7.3 | 19.4 | 7.4 | 0.68 | −1.9 |
| Present Invention 11 | material 1 | sliding | 3.365 | 18.3 | 6.9 | 18.7 | 7 | 0.68 | −1.7 |
| Present Invention 12 | material 1 | sliding | 3.362 | 14.8 | 4.3 | 14.9 | 4.4 | 0.69 | −1.6 |
| Present Invention 13 | material 1 | sliding | 3.360 | 13.1 | 3.9 | 13.1 | 4 | 0.69 | −1.3 |
| Present Invention 14 | material 1 | sliding | 3.356 | 10.9 | 3.1 | 10.9 | 2.9 | 0.7 | −1.2 |

A stainless steel sheet covered with graphite having a lattice spacing of more than 3.390 angstroms had a contact resistance after a corrosion test of more than 10 mΩ cm$^2$, which contact resistance was obtained in a condition in which the contact pressure was 20 kgf/cm$^2$, and it had a degree of degradation of less than −2.0 μV/hour. The performance of a cell was evaluated as better as the lattice spacing of d002 of the graphite decreased, namely as the graphite approached ideal graphite.

The especially preferable range of the lattice spacing of d002 was made 3.390 angstroms or less according to the above-described results, since the measured degree of degradation of a cell was more than −2.0 μV/hour in this range.

Example 3

Table 6 shows the results of evaluation of separators comprising electroconductive layers containing different types of adhesive agent. The methods of using the adhesive agents of all the examples were the same as the method of the example of present invention 2.

As shown in Table 6, a sheet member to which an adhesive agent consisting of PTFE was applied had a high degree of adhesion after a corrosion test, and a cell containing the sheet member did not show an increase in contact resistance.

TABLE 6

|  | Material | Adhesion agent | Lattice spacing d002 (Å) | Initial contact resistance (mΩ·cm$^2$) | | Contact resistance after corrosion test (mΩ·cm$^2$) | | Adhesion test |
| --- | --- | --- | --- | --- | --- | --- | --- | --- |
|  |  |  |  | 5 kgf/cm$^2$ | 20 kgf/cm$^2$ | 5 kgf/cm$^2$ | 20 kgf/cm$^2$ |  |
| Present Invention 15 | material 3 | PTFE | 3.365 | 24.8 | 8.7 | 24.2 | 8.8 | 100/100 |
| Present Invention 16 | material 3 | PVDF | 3.365 | 27.6 | 8.7 | 24.6 | 8.6 | 99/100 |

Example 4

Test samples were prepared by different methods of covering graphite as shown in Table 7, and the effect of the orientation of the graphite covered on a sheet member was evaluated to find a preferred range of the present invention. The term "press" in Table 7 means that the samples identified by this term were prepared by pressing, which was similar to the method of the examples 5 and 8 of the present invention. The term "coat" in Table 7 means that the samples identified by this term were prepared by coating with an adhesive agent, which was similar to the method of the examples 2 and 6 of the present invention. The term "slide" in Table 7 means that the samples identified by this term were prepared by sliding on a block of graphite, which was similar to the method of the examples 1, 4, and 7 of the present invention.

Each sheet member for a separator having an electroconductive layer was subjected to wide-angle X-ray diffraction, and the orientation of graphite of the obtained electroconductive layer was quantitatively evaluated with an index of I(110)/I(004), which is the ratio of the peak intensity of a diffraction line of a (110) atomic plane of a crystal of graphite to the peak intensity of a diffraction line of a (004) atomic plane.

The measurement by wide-angle X-ray diffraction was performed by the 2θ/θ scan method, in which the surface of the sheet member for a separator was irradiated with X-rays and this surface included the rotation axis of a goniometer so as to prevent measurement errors of diffraction angle and intensity.

Table 7 shows the relation of the orientation to contact resistance and cell properties. When the ratio of intensities I(110)/I(004) of a sample was less than 0.1, the sample had properties such that the contact resistance was high, the initial voltage was as high as 0.7 V or more, and the degradation of a cell was small. When the ratio of the intensities of a sample was less than 0.05, the sample had excellent properties.

stainless steel base metal, and comprising a nonmetallic electroconductive material, wherein the nonmetallic electroconductive material comprises graphite and the value of a lattice spacing of d002 of the graphite is at most 3.390 angstroms; and an electroconductive material which is located so as to penetrate the oxide film and which electrically contacts the stainless steel base metal and the electroconductive layer;

wherein when comparing peak intensities of diffraction lines of atomic planes of a crystal of the graphite located on the surface of the oxide film as measured by wide-angle X-ray diffraction, the ratio of a peak intensity of a diffraction line of a (110) atomic plane to a peak intensity of a diffraction line of a (004) atomic plane is less than 0.1, wherein the electroconductive material is formed of a boride-type metallic inclusion which has a $M_2B$-type structure and which is partly embedded in the stainless steel base metal, wherein M is a metal.

2. The stainless steel member according to claim 1, wherein the electroconductive layer is located on a surface of the electroconductive material.

3. The stainless steel member according to claim 1, wherein the boride-type metallic inclusion contains a chromium boride.

4. The stainless steel member according to claim 1, wherein the electroconductive layer is prepared by sliding a member containing graphite on a surface consisting of the surface of the oxide film and a surface of the boride-type metallic inclusion exposed on the stainless steel base metal.

5. The stainless steel member according to claim 4, wherein the surface consisting of the surface of the oxide film and the surface of the boride-type metallic inclusion exposed on the stainless steel base metal has an Ra roughness of at least 0.10 micrometers.

TABLE 7

| | | | Lattice spacing d002 (Å) | Orientation I(110)/I(004) | Initial contact resistance (mΩ·cm²) | | Contact resistance after corrosion test (mΩ·cm²) | | Initial cell voltage at 0.5 A/cm² (V) | Degree of degradation (μV/hr) |
|---|---|---|---|---|---|---|---|---|---|---|
| | Material | Method | | | 5 kgf/cm² | 20 kgf/cm² | 5 kgf/cm² | 20 kgf/cm² | | |
| Present Invention 20 | material 1 | press | 3.360 | 0.12 | 21.1 | 8.9 | 22.4 | 9 | 0.68 | −1.6 |
| Present Invention 21 | material 1 | roll | 3.360 | 0.10 | 18.2 | 5.4 | 19.3 | 6.1 | 0.69 | −1.7 |
| Present Invention 22 | material 1 | slide | 3.360 | 0.08 | 17.4 | 4.9 | 18.2 | 5.4 | 0.7 | −1.5 |
| Present Invention 1 | material 1 | slide | 3.360 | 0.05 | 13 | 2.8 | 16 | 2.9 | 0.71 | −1.3 |
| Present Invention 23 | material 1 | slide | 3.360 | ≈0 | 12.4 | 2.7 | 13.8 | 2.8 | 0.73 | −1.4 |
| Present Invention 24 | material 1 | press | 3.360 | 0.04 | 14.8 | 7.5 | 17.8 | 7.6 | 0.70 | −1.4 |
| Present Invention 25 | material 1 | coat | 3.360 | 0.07 | 19.1 | 7.1 | 21.9 | 7.2 | 0.69 | −1.5 |
| Present Invention 26 | material 1 | coat | 3.360 | 0.03 | 14.9 | 7.5 | 17.7 | 7.1 | 0.71 | −1.4 |
| Present Invention 27 | material 1 | slide | 3.360 | 0.01 | 10.8 | 5.1 | 13.8 | 5.2 | 0.72 | −1.3 |

The invention claimed is:

1. A stainless steel member for a separator of a solid polymer fuel cell, the member comprising:
   a stainless steel base metal;
   an oxide film located on a surface of the stainless steel base metal;
   an electroconductive layer located on a surface of the oxide film opposite to the oxide film surface located on the 6. The stainless steel member according to claim 1, wherein the electroconductive layer is prepared by coating a composition comprising the graphite and an adhesive agent on a surface consisting of the surface of the oxide film and an exposed surface of the boride-type metallic inclusion, the content of the adhesive agent in the composition being at most 2% by weight of the content of the graphite in the composition.

7. The stainless steel member according to claim 6, wherein the adhesive agent contains at least one of PVDF (polyvinylidene difluoride) and PTFE (polytetrafluoroethylene).

8. A solid polymer fuel cell having a stack of unit cells with individual separators disposed between them, each of the unit cells being prepared by laminating a fuel electrode film, a proton-exchange membrane, and an oxidant electrode film in this order, DC power being generated by supplying a fuel gas and an oxidant gas to the stack of unit cells, wherein each separator is obtained from the stainless steel member described in claim 1.

* * * * *